US008634553B2

(12) United States Patent
Hata et al.

(10) Patent No.: US 8,634,553 B2
(45) Date of Patent: Jan. 21, 2014

(54) ENCRYPTION KEY GENERATION DEVICE

(75) Inventors: Yoichi Hata, Yokohama (JP); Toshiaki Kakii, Yokohama (JP); Yasuhito Fujita, Yokohama (JP); Yoshimitsu Goto, Yokohama (JP); Hitoshi Kiya, Hino (JP); Kiyoshi Nishikawa, Hino (JP); Masaaki Fujiyoshi, Hino (JP); Shoko Imaizumi, Hino (JP)

(73) Assignees: Sumitomo Electric Industries, Ltd., Osaka (JP); Tokyo Metropolitan University, Tokyo (JP)

( * ) Notice: Subject to any disclaimer, the term of this patent is extended or adjusted under 35 U.S.C. 154(b) by 184 days.

(21) Appl. No.: 13/283,877

(22) Filed: Oct. 28, 2011

(65) Prior Publication Data

US 2012/0121088 A1    May 17, 2012

Related U.S. Application Data

(63) Continuation-in-part of application No. PCT/JP2009/058400, filed on Apr. 28, 2009, and a continuation-in-part of application No. 12/522,642, filed as application No. PCT/JP2008/070037 on Nov. 4, 2008, now abandoned.

(30) Foreign Application Priority Data

| Nov. 5, 2007 | (JP) | ................................. 2007-287756 |
| Apr. 17, 2008 | (JP) | ................................. 2008-108115 |

(51) Int. Cl.
*H04K 1/00*    (2006.01)
(52) U.S. Cl.
USPC ............................................ 380/44; 380/255
(58) Field of Classification Search
None
See application file for complete search history.

(56) References Cited

U.S. PATENT DOCUMENTS

| 7,313,814 B2 * | 12/2007 | Zhu et al. ........................... 726/6 |
| 7,706,530 B2 * | 4/2010 | Suga et al. ...................... 380/44 |
| 2004/0174999 A1 * | 9/2004 | Iwamura et al. ............... 380/277 |

FOREIGN PATENT DOCUMENTS

| CN | 1661957 A | 8/2005 |
| CN | 101401348 A | 4/2009 |

(Continued)

OTHER PUBLICATIONS

Young Wu et al. "Progressive Protection of JPEG 2000 Condestreams," International Conference on Image Processing (ICIP) 2004, Young Wu et al., pp. 3447-3450.*

(Continued)

*Primary Examiner* — Jung Kim
*Assistant Examiner* — Ghodrat Jamshidi
(74) *Attorney, Agent, or Firm* — McDermott Will & Emery LLP

(57) ABSTRACT

A master key ($K_{2,2}$) inputted by an input unit is stored in a storage unit. A matrix generating unit generates key element matrices (M1-M3) with respect to each of split keys ($e_{R2}$, $e_{R1}$, $e_{R3}$) obtained by a key dividing unit dividing the master key ($K_{2,2}$). To each coordinate entry of the key element matrices (M1-M3), operation data that successively obtained by repeating a hash operation with a one-way hash function is assigned, so as to maintain hierarchical nature of scalability (L). A key generating unit generates partial keys ($K_{1,1}$-$K_{2,2}$) corresponding to respective hierarchies of the scalabilities (R, L), on the basis of the key element matrices (M1-M3). These partial keys ($K_{1,1}$-$K_{2,2}$) are outputted to a coding unit or a decoding unit by an output unit.

12 Claims, 24 Drawing Sheets

(56) References Cited

FOREIGN PATENT DOCUMENTS

| JP | 2003-204321 | 7/2003 |
|---|---|---|
| JP | 2004-297778 | 10/2004 |
| JP | 2004-312740 | 11/2004 |
| JP | 2005-051727 | 2/2005 |
| JP | 2005-109753 | 4/2005 |
| JP | 2006-020292 | 1/2006 |
| WO | 2004-034636 A1 | 4/2004 |

OTHER PUBLICATIONS

US Office Action in U.S. Appl. No. 12/522,642 dated Dec. 30, 2011.
"Progressive Protection of JPEG 2000 Condestreams", Wu et al., International Conference on Image Processing (ICIP), 2004, p. 3447-p. 3450.

International Search Report issued in International Application No. PCT/JP2009/058400 dated Jun. 30, 2009.

Wang Cai-fen et al., "Publicly verfiable partial key escrow scheme," Journal of China Institute of Communications, vol. 23, No. 5, May 31, 2002, pp. 154-158, with English Abstract.

Lu Shi-hui et al., "An Expansion Scheme for Secret Sharing Members Without the Trusted Institution," Computer Engineering & Science, vol. 26, No. 2, Feb. 29, 2004, pp. 23-24 and 35, with English Abstract.

Yongdong Wu, "Progressive Protection of JPEG2000 Codestreams," IEEE, 2004 International Conference on Image Processing (ICIP), Oct. 27, 2004, pp. 3447-3450.

Notification of the First Office Action issued in Chinese Application No. 200980159024.9 dated Oct. 10, 2013.

* cited by examiner

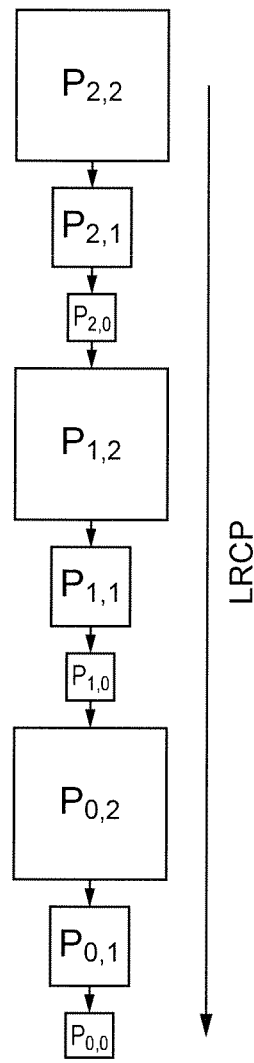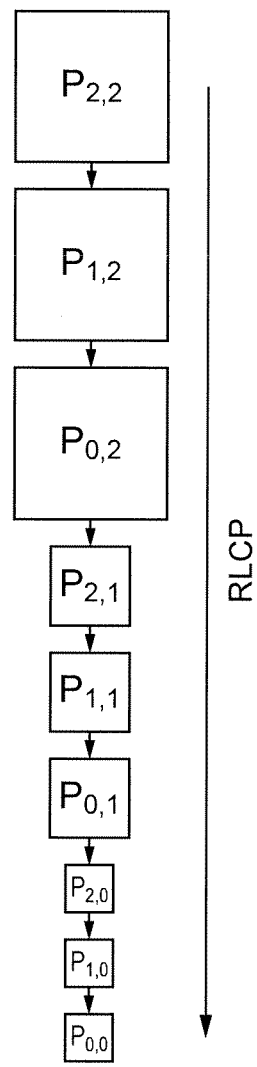

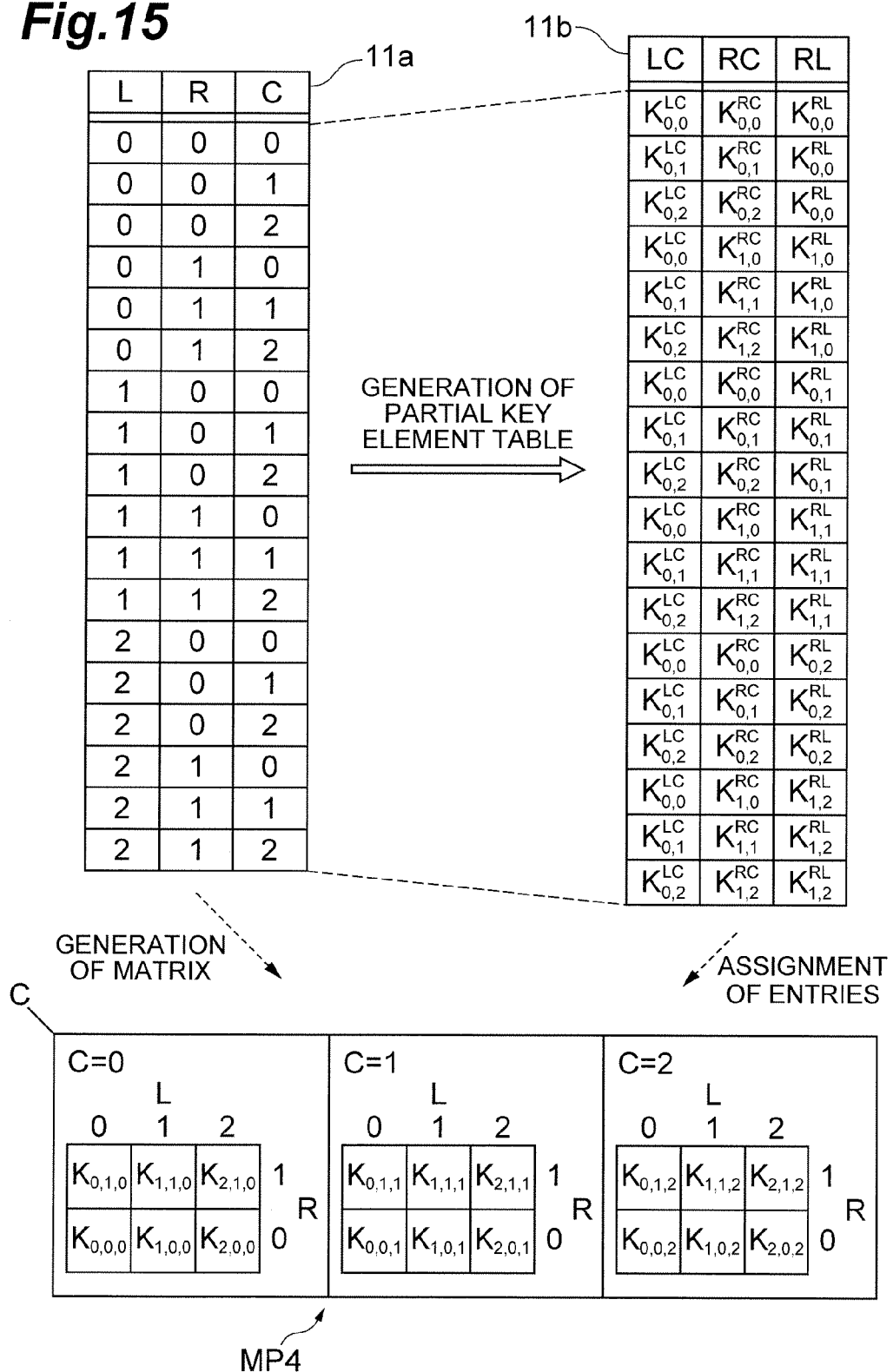

ENCRYPTION KEY GENERATION DEVICE

CROSS-REFERENCE TO RELATED APPLICATIONS

This application is a Continuation-In-Part of International Application No. PCT/JP2009/058400, filed Apr. 28, 2009, the disclosure of which application is incorporated by reference herein. This application is also a Continuation-In-Part of U.S. application Ser. No. 12/522,642, filed Nov. 4, 2008, which is the U.S. National Phase under 35 U.S.C. §371 of International Application No. PCT/JP2008/070037, filed on Nov. 4, 2008, which in turn claims the benefit of Japanese Application Nos. 2007-287756, filed on Nov. 5, 2007 and 2008-108115, filed on Apr. 17, 2008, the disclosures of which Applications are incorporated by reference herein.

BACKGROUND OF THE INVENTION

1. Field of the Invention

The present invention relates to an apparatus and method of generating of an encryption key used in coding (encryption) and decoding (decryption) of digital data with plural types of hierarchical scalabilities and, more particularly, to an apparatus and method of automatically generating partial encryption keys corresponding to respective data units in hierarchies in each scalability.

2. Related Background Art

In recent years, the spread of information and communications services through networks has also increased services to transmit data to unspecified masses, e.g., a delivery service of digital contents such as images (including one-frame data of a moving picture). In conjunction therewith, there is a demand for highly advanced functionality in protection technology of digital data.

In general, a coded digital image or the like is decoded in a quality (distortion, resolution, color representation, or the like) determined in a coding process. With diversification of communication channels, diversification of communication terminals, and diversification of delivery services, there is a demand for capability of decoding the image in a quality different from the quality determined in the coding process, by decoding a certain part of a codestream, i.e., scalability. For meeting this demand for scalability, for example, JPEG2000 (Joint Photographic Experts Group 2000) being the international standard of image compression provides hierarchized scalabilities with scales such as resolution. In the protection technology of hierarchically protecting data in different qualities, it is common practice to perform encryption using individual partial keys for respective data units located in respective hierarchies in each of scalabilities.

The known protection technologies of digital data as described above include, for example, those of Japanese Patent Application Laid-open No. 2004-312740 (Patent Document 1), Japanese Patent Application Laid-open No. 2003-204321 (Patent Document 2), Y. Wu, D. Ma, and R. H. Deng, "Progressive protection of JPEG 2000 condestreams." In Proc. IEEE ICIP, pp. 3447-3450, 2004 (Non-patent Document 1), M. Fuhiyoshi, S, Imaizumi, and H. Kiya, "Encryption of composite multimedia contents for access control," IEICE Trans. Fundamentals, Vol. E90-A, No. 3, pp. 590-596, March 2007 (Non-patent Document 2), and Shoko Imaizumi, Masaaki Fujiyoshi, Yoshito Abe, and Hitoshi Kiya, "Hierarchical encryption method of JPEG2000 for coded images with resistance to collusion attacks," IEICE SIP symposium, 2006 (Non-patent Document 3).

Non-patent Document 1 discloses the technology of generating partial keys corresponding to data units in lower hierarchies from one master key by applying a one-way hash function to digital data with hierarchical scalabilities. Non-patent Document 2 discloses the technology independent of an order of streaming data, which is a problem of Non-patent Document 1. Furthermore, Non-patent Document 3 cited above discloses the technology of improving the resistance to collusion attacks, which is a problem of Non-patent Document 1.

A collusion attack is such an act that plural types of encryption keys corresponding to different hierarchical levels in respective scalabilities are shared among a plurality of users, so as to implement reproduction of the image in a quality higher than a preliminarily authorized quality.

SUMMARY OF THE INVENTION

The inventors thoroughly investigated the conventional data protection technologies and found the following problem. Namely, for hierarchically protecting digital data of different qualities, encryption keys are separately managed for respective types of scalabilities, or the encryption is carried out using individual encryption keys (partial keys) for respective data units located in respective hierarchies in each of scalabilities.

Particularly, in the case of managing individual partial keys generated for respective data units, an increase in the number of hierarchies leads to an increase in the number of keys to be managed, and a sufficient key length has to be ensured in order to maintain the resistance to collusion; therefore, the total key length will be considerably long with increase in hierarchies in each scalability.

On the contrary, in the case where partial keys corresponding to respective data units are generated from one master key, it is necessary to divide the master key by the number of partial keys, and, as in Non-patent Document 3, an increase in the number of partial keys will inevitably result in shortening the length of each partial key to be generated. In this case, the sufficient resistance to collusion cannot be ensured.

The present invention has been accomplished in order to solve the problem as discussed above, and an object of the present invention is to provide an encryption key generating apparatus and method having a structure which ensures sufficient resistance to collusion attacks on digital data with hierarchical scalabilities and achieves drastic reduction in the key length of encryption keys corresponding to respective hierarchies in each scalability.

An encryption key generating apparatus and method according to the present invention are applicable to a communication system offering a delivery service of digital data with plural types ($\geq 2$) of hierarchical scalabilities (hereinafter referred to as delivery system), and then generate an encryption key (a group of partial keys respectively corresponding to hierarchies at a higher position than the hierarchy of the master key) used in coding and decoding of the digital data, by setting, as a master key, a partial key of the hierarchy at the lowest position out of the hierarchies satisfying a pre-contracted service level. Specifically, the delivery system applied with the encryption key generating apparatus and method includes a communication system offering picture transmission systems and teleconference systems using multimedia such as packet codestreams of JPEG2000 being the international standard of image compression and also offering streaming delivery services. The encryption key generating apparatus according to the present invention can realize the encryption key generating method according to the present invention, and comprises input means, storage means, key dividing means, matrix generating means, key generating means, and output means. The encryption key generating apparatus and method generate partial keys of hierarchies at subordinately higher positions from a master key, as an encryption key to be used in coding and decoding of the digital data for delivery. Therefore, the encryption key generating apparatus enables simultaneous access control on a plurality of scalabilities by a single codestream.

Specifically, in an encryption key generating apparatus according to the present invention, the input means inputs a pre-set encryption key (partial key), and the storage means stores the partial key inputted by the input means, as a master key. This master key is a partial key at the lowest position out of hierarchies satisfying a service level allowed by the communication system (delivery system) offering a data delivery service, concerning each of the scalabilities. The key dividing means generates slit keys from stored in the storage means. Subsequently, the encryption key generating apparatus generates, as a minimum processing unit, partial keys respectively corresponding to the data units of the hierarchies in the two types of scalabilities selected. Namely, the matrix generating means generates key element matrices respectively corresponding to the split keys generated by the key dividing means. The key generating means generates partial keys each corresponding to hierarchies using the entry combining of the key element matrices. Further, the output means outputs the partial keys generated by the key generating means in the minimum processing unit, to a device executing at least one of coding and decoding of the digital data, for example coding means, decoding means, or the like. The key element matrices are generated based on the split keys corresponding to the respective hierarchies, on a hierarchy-by-hierarchy basis of one scalability. In each key element matrix, coordinates of each entry are defined by respective hierarchical values (corresponding to hierarchical levels) in the two types of scalabilities, whereby each matrix entry coordinately corresponds to a data unit in respective hierarchies in the two types of scalabilities. The encryption key generating apparatus is characterized by generating each of the partial keys in hierarchies at subordinately higher positions from the only managed master key. Therefore, partial keys in hierarchies at subordinately higher positions are also generated from a master key on a decryption occasion and, for example, in a multimedia delivery service, a user receives only a delivered decryption key for the lowest packet in a packet group authorized to open. In this case, the given decryption key itself serves as the master key in the encryption key generating method and each of hierarchies in respective scalabilities corresponding to this master key is the lowest hierarchy.

First, set as the master key stored in the storage means is an encryption key used in coding and decoding of a data unit in hierarchies at the lowest position out of hierarchies satisfying a service level allowed by the delivery system, in each of first and second scalabilities selected from the plural types of scalabilities which the digital data as a coded object has. On the contrary, when the master key is a decryption key obtained by delivery or the like, each of hierarchies in respective scalabilities corresponding to the master key is the lowest hierarchy. The key dividing means divides this master key by the number of hierarchies in the first scalability set as a reference scalability out of the first and second scalabilities, to generate split keys corresponding to the respective hierarchies of the first scalability.

Key element matrices, which are generated by the matrix generating means based on the respective split keys, coordinately correspond to data units in respective hierarchies in the first and second scalabilities. In generation of a key element matrix generated based on one split key out of the resultant split keys, at least coordinate entries corresponding to respective hierarchies from the lowest hierarchy to the highest hierarchy in the second scalability in the hierarchy in the first scalability corresponding to the one split key are assigned operation data successively obtained by repeating a hash operation on the one split key using a one-way hash function. This maintains the hierarchical nature of the second scalability.

Subsequently, the key generating means combines key elements coordinately consistent among the key element matrices generated with the respective split keys, thereby generating partial keys corresponding to data units in the respective hierarchies in the first and second scalabilities. Namely, the key generating means generates partial keys for coding or decoding each of the data units of higher hierarchies including the hierarchy of the master key. This configuration also maintains the hierarchical nature of the first scalability.

In the encryption key generating apparatus according to the present invention, the key generating means preferably selects, as the aforementioned reference scalability, a scalability having a smaller number of hierarchies out of the first and second scalabilities. This configuration is less likely to be affected by increase in the number of hierarchies in one or more scalabilities.

The matrix generating means assigns, as entry information of a key element matrix generated based on one split key out of the split keys, the same operation data as the operation data successively obtained for the hierarchy of the one split key, to coordinate entries corresponding to respective hierarchies from the lowest hierarchy to the highest hierarchy of the second scalability in a hierarchy at a lower position than the hierarchy in the first scalability corresponding to the one split key. On the other hand, the matrix generating means assigns operation data, obtained by a hash operation with a one-way hash function on a key element in the highest hierarchy of the second scalability out of key elements in the hierarchy corresponding to the one split key, to all coordinate entries corresponding to respective hierarchies from the lowest hierarchy to the highest hierarchy of the second scalability in a hierarchy at a higher position than the hierarchy in the first scalability corresponding to the one split key.

As described above, the encryption key generating apparatus and method according to the present invention are not restricted by progression orders of codestreams, different from the conventional encryption key generating methods required to prepare a plurality of codestreams and master keys according to progression orders. Furthermore, the encryption key generating apparatus and method according to the present invention generate the encryption keys (partial keys) corresponding to respective data units subordinately from the master key and enables simultaneous access control on a plurality of scalabilities by a single codestream. This achieves drastic reduction in information amount of the codestream and managed encryption key (master key) and enables effective improvement in safety in management and delivery of digital contents and the encryption key.

Furthermore, when the digital data as a coded target has three or more types of scalabilities, the encryption key generating apparatus and method according to the present invention select two types of scalabilities out of these three or more types of scalabilities, and partial keys (to be used in coding and decoding of the data unit corresponding to each partial key), which are individually correspond to the data units of the higher hierarchies including the hierarchy of the master key, are generated by executing the aforementioned minimum processing unit (key generating operation by the matrix generating means and the key generating means), for all combinations of two types of scalabilities selected out thereof.

Namely, the matrix generating means generates, with all the combinations of two types of scalabilities, a partial key element matrix for each combination. On this occasion, the matrix generating means also generates a hierarchy table as one showing all combinations of hierarchical values in the plural types of scalabilities. This hierarchy table is a coordinate representation of partial key matrices whose entries are partial keys corresponding to data units of respective hierarchical values in the plural types of scalabilities, by combinations of hierarchical values. This hierarchy table shows a correspondence relation between the types of scalabilities and the hierarchical values and entries of the partial key element matrices generated for all combinations of scalabilities can be specified from this relation.

Then the key generating means involves combining entries in the respective partial key element matrices generated for all the combinations of two types of scalabilities, each of which is specified by two hierarchical values out of hierarchical values constituting one combination and types of scalabilities thereof, for all the combinations of hierarchical values in the hierarchy table. An element resulting from this combining step for each combination of hierarchical values is an entry in a partial key element matrix as it is. Therefore, partial keys corresponding to data units in respective hierarchies in the plural types of scalabilities are sequentially generated by the key generating means combining entries made in correspondence by the hierarchy table from the respective partial key element matrices. The output means outputs the partial keys generated to a device executing at least one of coding and decoding of the digital data, for example coding means, decoding means, or the like.

In the generation of the encryption key used in coding and decoding of digital data with hierarchical scalabilities being three or more types of scalabilities, the resistance to collusion attacks can be further improved in comparison with the above-described encryption key generating apparatus and method.

Specifically, in each of three or more types of scalabilities, the input means inputs an encryption key used in coding and decoding of a data unit in hierarchies at the lowest position out of the hierarchies satisfying a service level allowed by the delivery system, and the storage means stores the encryption key inputted by the input means as the master key (in the case where the master key is a decryption key obtained by delivery or the like, each of hierarchies in the respective scalabilities corresponding to the master key is the lowest hierarchy). At this time, the key dividing means selects first and second reference scalabilities from the three or more types of scalabilities. The first reference scalability is a scalability for generation of split keys from the master key stored in the storage means, and the key dividing means generates the master key by the number of hierarchies in the first reference scalability, thereby generating split keys corresponding to the respective hierarchies in the first reference scalability. Here, the second reference scalability is a scalability for defining an operation direction of the hash operation with the one-way hash function as described above.

In the encryption key generating apparatus, the matrix generating means generates a multidimensional key element matrix as a coordinate representation of hierarchical values in the three or more types of scalabilities, by a series of operations corresponding to respective hierarchies in the first reference scalability, for each hierarchy in each of scalabilities other than the first and second reference scalabilities out of these three or more types of scalabilities. For that, let S be the number of scalabilities, and $N_K$ (K=1, 2, 3, ..., i-1, or i), specifically, $N_1, N_2, \ldots, N_{i-1}$, or $N_i$ in order from the smallest be the number of hierarchies in each scalability; for the total packet number given by Mathematical Expression (1) below, the number of multidimensional key element matrices generated in the encryption key generating method is given by Mathematical Expression (2) below.

$$\prod_{i=1}^{S} N_i \quad (1)$$

$$\prod_{i=1}^{S-1} N_i \quad (2)$$

Specifically, the matrix generating means assigns, as entry information in each of multidimensional key element matrices generated, operation data successively obtained by repeating a hash operation on the one split key using a one-way hash function, to at least coordinate entries corresponding to respective hierarchies from the lowest to the highest in the second reference scalability in a hierarchy in the first reference scalability corresponding to one split key out of the generated split keys. This maintains the hierarchical nature of at least the second reference scalability in the multidimensional key element matrix obtained.

Subsequently, the key generating means combines entries coordinately consistent among the respective multidimensional key element matrices generated by the series of operations corresponding to the respective hierarchies in the first reference scalability, for the respective hierarchies in each of the scalabilities other than the first and second reference scalabilities, so as to generate partial keys corresponding to data units in the respective hierarchies in the plural types of scalabilities. Namely, since the multidimensional key element matrices obtained are generated with the respective hierarchies of the first reference scalability, for each of hierarchies in each of the scalabilities other than the first and second reference scalabilities, the hierarchical nature of the first reference scalability is also maintained in a partial key matrix finally generated from the obtained multidimensional key element matrices.

Here, as entry information in each of the multidimensional key element matrices generated by the series of operations corresponding to the respective hierarchies in the first reference scalability, for the respective hierarchies in each of the scalabilities other than the first and second scalabilities, coordinate entries corresponding to respective hierarchies from the lowest to the highest of the second reference scalability in a hierarchy at a lower position than respective corresponding hierarchies of the other scalability and the first reference scalability are assigned the same operation data as the operation data successively obtained with one split key assigned to the corresponding hierarchy of the first reference scalability. On the other hand, all coordinate entries corresponding to respective hierarchies from the lowest to the highest of the second reference scalability in a hierarchy at a higher position than the respective corresponding hierarchies of the other scalability and the first reference scalability are assigned operation data obtained by a hash operation with a one-way hash function on a key element in the highest hierarchy in the second reference scalability out of key elements in the hierarchy corresponding to the one split key.

The output means outputs the partial keys generated by the key generating means in the foregoing minimum processing unit, to a device executing at least one of coding and decoding of the digital data, for example coding means, decoding means, or the like.

Each of embodiments according to the present invention will become further fully understood by the following detailed description and accompanying drawings. These embodiments are presented by way of illustration only and should not be construed as limiting the present invention.

A further application range of this invention will become apparent from the following detailed description. It should be, however, noted that the detailed description and specific examples will be presented to explain preferred embodiments of the present invention by way of illustration only, and it is apparent that a variety of modifications and improvements within the scope of the invention are obvious to those skilled in the art in view of the detailed description.

BRIEF DESCRIPTION OF THE DRAWINGS

FIGS. 4A and 4B show a conceptual diagram for explaining progressive orders;

FIG. 15 is a drawing showing generation of a hierarchy table by the matrix generating means of the encryption key generating apparatus according to the fourth embodiment, and a coordinate correspondence relation between partial key element matrices and a partial key matrix;

DESCRIPTION OF THE PREFERRED EMBODIMENTS

In the following, embodiments of an encryption key generating apparatus and method according to the present invention will be described below in detail with reference to FIGS. 1, 2A, 2B, 3, 4A to 5B, 6 to 15, 16A to 20C, 21, and 22A to 24D. In the description of the drawings the same portions and the same elements will be denoted by the same reference symbols, without redundant description.

The encryption key generating apparatus and method according to the present invention are to generate an encryption key used in coding and decoding of digital data with plural types of hierarchical scalabilities. Each of the embodiments will be described using a specific example of digital data with hierarchical scalabilities, as to generation of partial keys corresponding to respective packet codestreams of JPEG2000 being the international standard of image compression, for simplicity. JPEG2000 allows an order of priorities to be given to types of scalabilities. This order in a codestream is expressed as a construction order (progression order) of packets being data units. Elements to determine this progression order include four types of scalabilities, layer (L), resolution level (R), component (C), and position (P).

Figure 1:
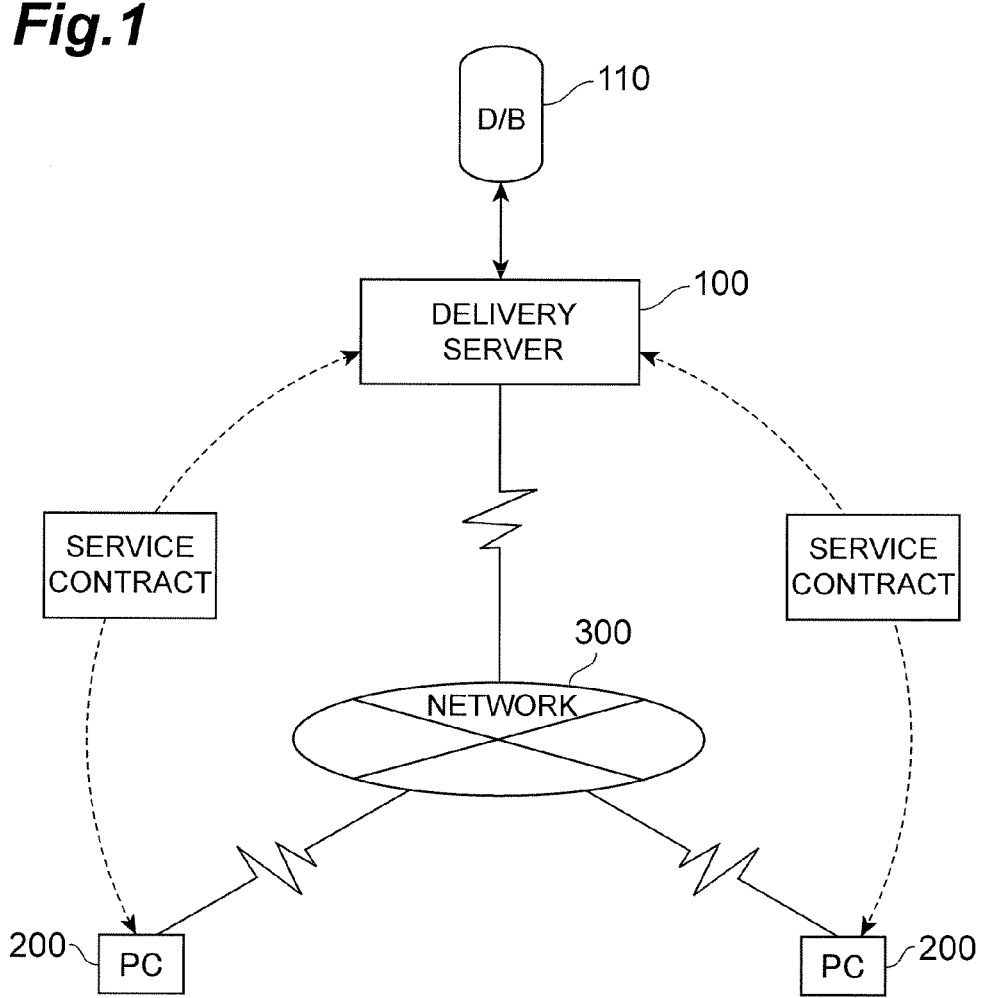
FIG. 1 is a drawing showing the schematic structure of a delivery system for digital data applied with an encryption key generating apparatus and method according to the present invention.

FIG. 1 is a drawing showing the schematic structure of a delivery system for digital data applied with an encryption key generating apparatus and method according to the present invention. The delivery system shown in FIG. 1 includes a communication system offering picture transmission systems and teleconference systems which offers a delivery service for digital data having a hierarchical scalability and also offering a streaming delivery service. Also, this delivery system comprises a network 300 without regard to wired or wireless, plural information processing terminals 200 (hereinafter referred to as PC) such as for example personal computer respectively connected to the network 300, and a delivery server 100, and the PCs 200 and the delivery server 100 are enable to execute an interactive communication for multimedia including digital data through the network 300. The delivery server 100 manages a database (hereinafter referred to as D/B) 110, as an external storage device, in which plural kinds of digital data contents are preliminarily stored for a delivery service. Between each of the PCs 200 and the delivery server 100, a contract regarding a delivery service for digital data is preliminarily is closed, and the delivery server 100 deliveries digital data with a quality of preliminarily contracted level, when receiving a request for delivery fro the PC 200.

Figure 2A:
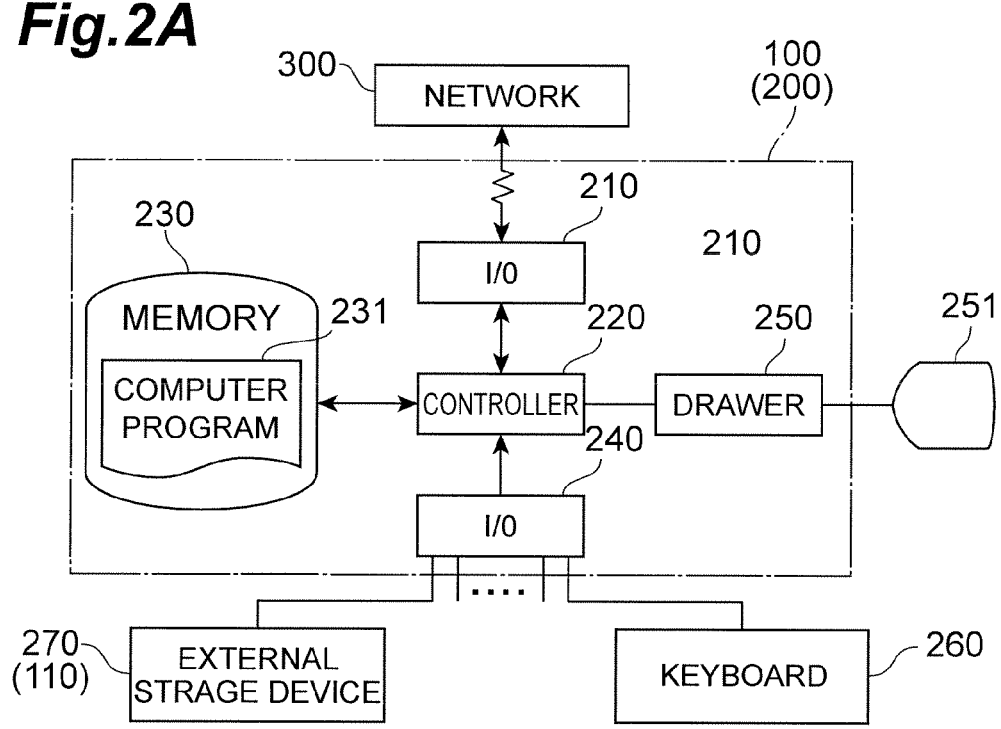
FIGS. 2A and 2B show a structure of each part in an information processing apparatus (delivery server or PC) constituting a part of the delivery system shown in FIG. 1.
Figure 2B:
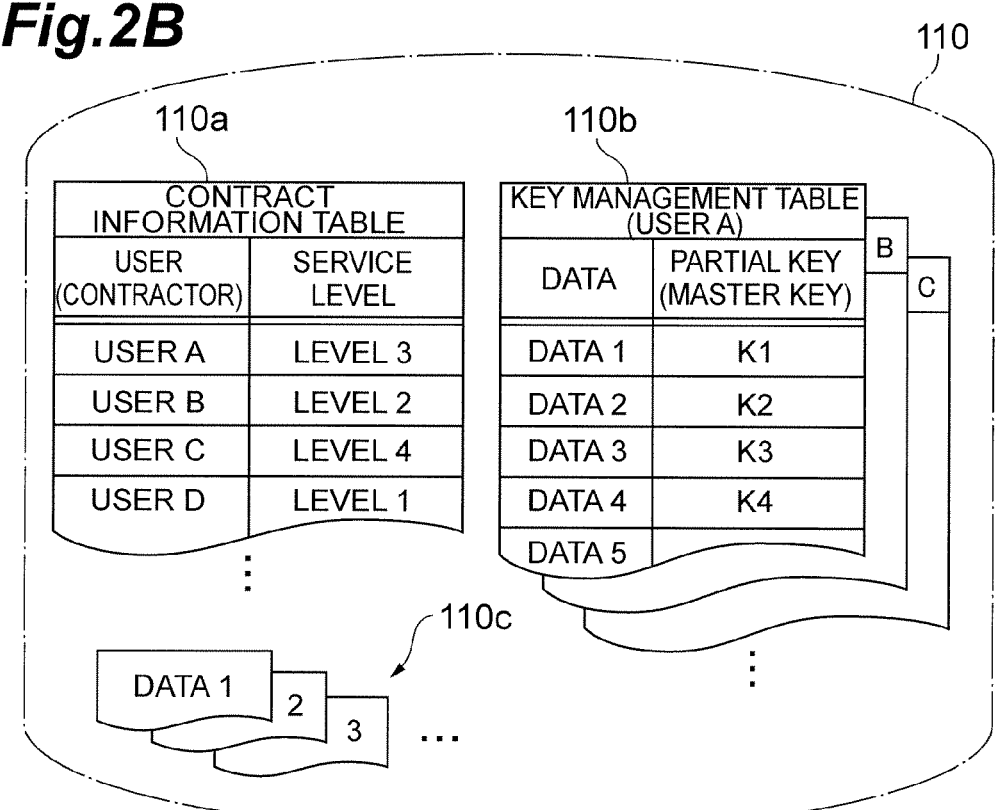

The structure of an information processing apparatus such as the delivery server 100, the PCs 200 and the like, which constitute a part of the above0described delivery system, is shown in FIGS. 2A and 2B. In particular, FIG. 2A shows a structure of the delivery server 100 or the PC 200, and FIG. 2B shows a logical structure of the D/B 110 managed by the delivery server 100.

Namely, As shown in FIG. 2A, the delivery server 100 or the PC 200 comprises an input/output means (hereinafter referred to as I/O) 210 for transmitting and receiving data to another information processing apparatus through the network 300, a controller 220 executing plural operation programs 231, a memory 230 as storage means in which such operation programs and data are stored, and an input/output means (hereinafter referred to as I/O) 240 for allowing data communication to plural peripheral devices. On the monitor 251, data for display, produced by the drawer 250, is displayed. To the I/O 240, the external storage device 270 such as D/B 110 to be managed by the delivery server 100, the key board 260 and the pointing device as input means.

In the D/B 110 as an external storage device managed by the delivery server 100, a contract information table 110a, key management table 110b and digital data groups 110c for delivery are preliminarily stored. The contract information table 110a homologizes users (contractors) as an operator of PC 200 and service levels reflecting contract. The key management table 110b homologizes digital data (plural digital contents for delivery) stored in D/B 110 and partial keys (master keys) for coding these digital contents, every each user (contractor).

Figure 3:
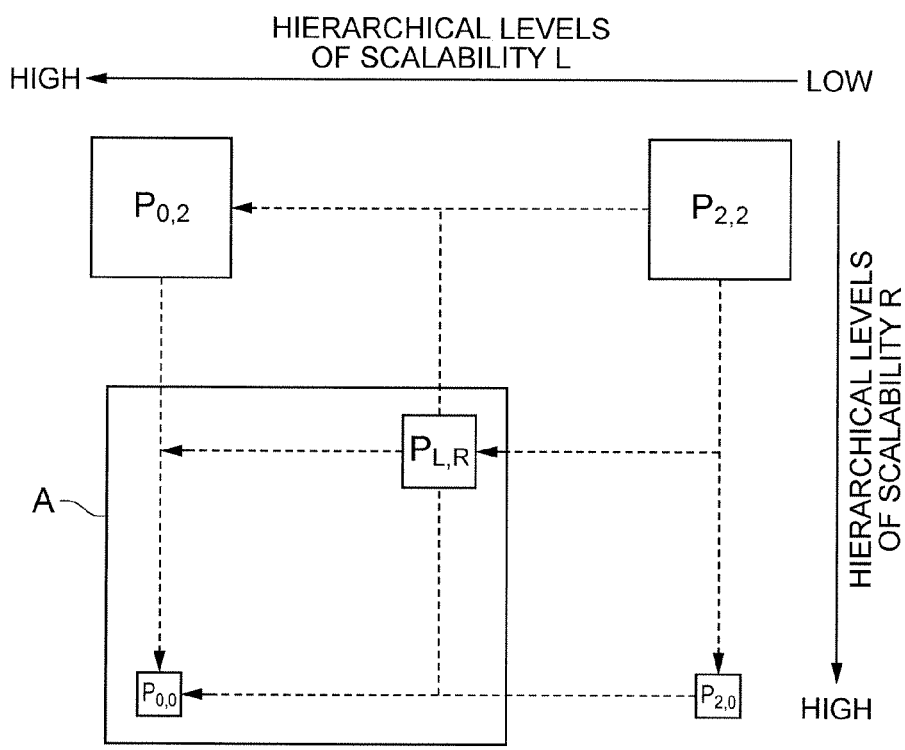
FIG. 3 is a conceptual diagram for explaining a data structure of digital data which becomes a delivered target in the delivery system shown in FIG. 1 and has plural types of hierarchical scalabilities.

FIG. 3 is a conceptual diagram for explaining a data structure of digital data which becomes a delivered target in the delivery system shown in FIG. 1 and has plural types of hierarchical scalabilities. Further FIG. 3 shows a decoding pattern of packet codestreams in JPEG2000 when scalabilities as access control targets out of the scalabilities of JPEG2000 are limited to only the layer (L) and the resolution level (R) (a case of a grayscale picture). Specifically, in FIG. 1, the number of hierarchies $N_L$ in the layer (scalability L) is 3 and the number of hierarchies $N_R$ in the resolution level (scalability R) is 3. The layer is also called a quality layer and means arithmetic code data of a digital image corresponding to SNR (Signal/Noise Ratio) in reproduction of image. Since a higher layer contains information with greater effect on the image quality, the quality of a reproduced image can be improved stepwise by successively adding data of a lower layer to data of a higher layer.

In this FIG. 3, $P_{i,j}$ ($i=0, \ldots, N_L-1$; $j=0, \ldots, N_R-1$; i a hierarchy number of scalability L; j a hierarchy number of scalability) represents JPEG2000 packets with image information. When $Q_{L,R}$ represents a JPEG2000 coded image with a certain quality, all packets $P_{i,j}$ ($i=0, \ldots, L$; $j=0, \ldots, R$) within frame A in FIG. 1 have to be decoded in order to obtain $Q_{L,R}$. For normally reproducing the image, all the packets $P_{i,j}$ to be decoded must be decrypted. Therefore, it is necessary to individually encrypt the packets $P_{i,j}$ in order to maintain the hierarchical nature in access control.

In JPEG2000 as described above, there are five types of progression orders, LRCP, RLCP, RPCL, PCRL, and CPRL, and priorities are given to respective elements in descending order from the top. FIGS. 4A and 4B are conceptual diagrams for explaining progressive orders showing priority orders in decoding the JPEG2000 packet codestreams shown in FIG. 3. Particularly, FIG. 4A shows a decoding order in the LRCP progression order with the highest priority to scalability L (layer), and FIG. 4B shows a decoding order in the RLCP progression order with the highest priority to scalability R (resolution level).

Figure 5A:
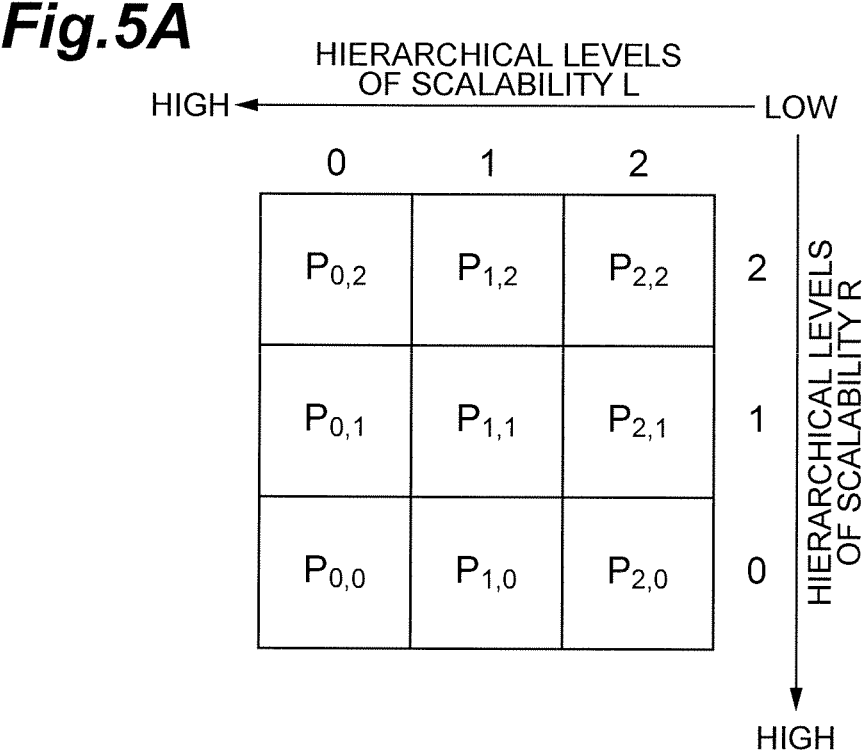
FIGS. 5A and 5B show matrix representations of data units (corresponding to respective packages of JPEG2000) of digital data with two types of three-layered scalabilities, and partial keys corresponding thereto.
Figure 5B:
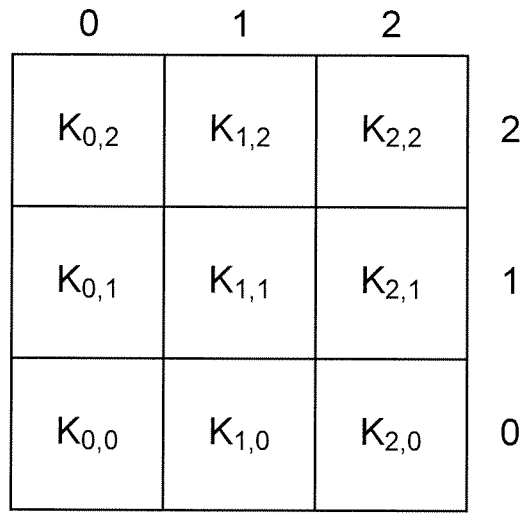

The encryption key generating apparatus and method according to the present invention generate an encryption key of which the key length is reduced in terms of safety and easy production in management and delivery of the encryption key, and which has the resistance to collusion attacks. Since the encryption key generating apparatus and method handle each packet as a matrix entry specified by hierarchical levels of respective scalabilities in order to generate encryption keys for the respective JPEG2000 packets as described above, the progression orders in JPEG2000 do not matter. As an example, FIG. 5A shows packets $P_{L,R}$ (L:0 (highest), 1, 2 (lowest); R:0 (highest), 1, 2 (lowest)) in a matrix representation with hierarchical levels of scalability L (layer) and hierarchical levels of scalability R (resolution level). FIG. 5B shows partial keys $K_{L,R}$ (L:0, 1, 2; R:0, 1, 2) in a matrix representation corresponding to the packets $P_{L,R}$ in FIG. 5A.

A collusion attack herein is such an attack that two or more users illegally share their encryption keys, so as to enable reproduction of an image in a quality higher than a regularly authorized quality. Specifically, let us consider a collusion case using an example of a JPEG2000 coded image, in which a collusion is made by a user authorized to open only the highest layer (layer 0) and a user authorized to open only the highest resolution level (resolution level 0). In this case, when $K_{i,j}$ represents an encryption key for packet $P_{i,j}$, one user receives encryption keys $K_{0,j}$ (j=0, 1, 2) for three packets $P_{0,j}$ (j=0, 1, 2) and the other user receives encryption keys $K_{i,0}$ (i=0, 1, 2) for three packets $P_{i,0}$ (i=0, 1, 2), as regularly authorized keys. If the resistance is not enough to collusion attacks, these users could collude and illegally generate encryption keys $K_{2,2}$, $K_{2,0}$, $K_{0,2}$, and $K_{1,1}$ which are not authorized for the two users. In the encryption key generating operation (encryption key generating method according to the present invention) executed in the encryption key generating apparatus according to the present invention, as described in each of the embodiments below, an encryption key (partial key) for a certain packet cannot be generated from a packet in a hierarchy at a higher position in at least one scalability than that of the packet of interest, and can be generated from a packet in a hierarchy at an identical or lower position in each scalability. For this reason, the encryption key generating apparatus and method according to the present invention have the resistance to collusion attacks.

Figure 6:
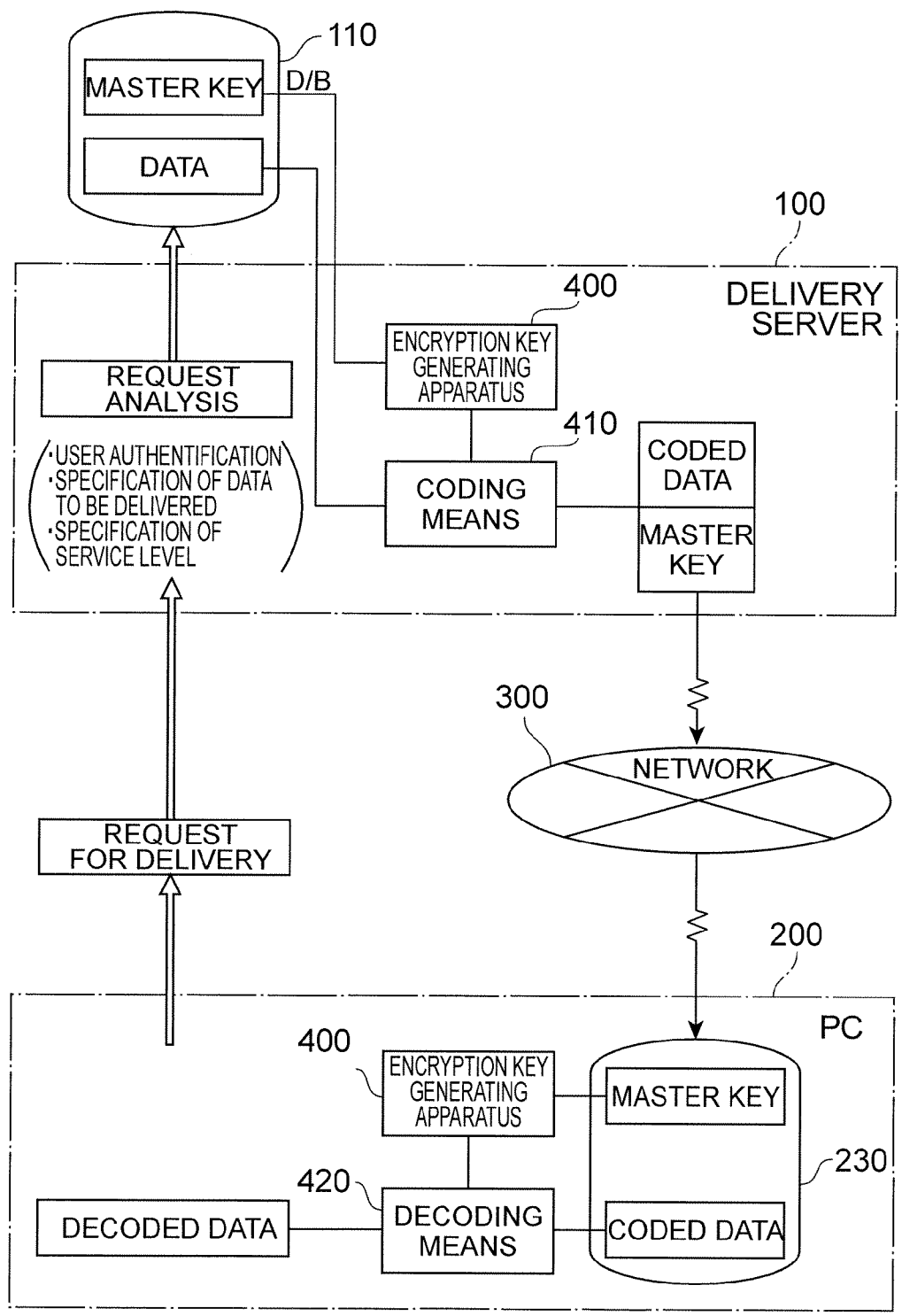
FIG. 6 is a logical block diagram for explaining data delivery operation in the delivery system (FIG. 1) of the digital data applied with the encryption key generating apparatus according to the present invention.

Next, a data delivery operation in the delivery system for digital data shown in FIG. 1 will be described using FIG. 6. FIG. 6 is a logical block diagram for explaining data delivery operation in the delivery system (FIG. 1) of the digital data applied with the encryption key generating apparatus according to the present invention. The delivery server 100 and each PC 200 have the same structure shown in FIG. 2A.

As shown in FIG. 6, the delivery service from the delivery server 100 to the PC 200 starts by the PC 200 sending a delivery request to the delivery server 100. As receiving the delivery request from the PC 200, a request analysis executed in the delivery server 100. In this request analysis, an authentication proceeding for user having sent a delivery request, specification of data to be delivered, and specification of service level are executed.

In the delivery server 100, after the request analysis, data that a delivery is requested is read-out from the D/B 110, and a master key corresponding to the read-out data is also read-out, the master key being a partial key for generating encryption key using a coding of the read-out data. The encryption key generation apparatus 400 (encryption key generation apparatus according to the present invention) inputs the master key, and generates partial keys (partial keys respectively corresponding to higher hierarchies at higher positions than the hierarchy corresponding to the master key) using such a master key. Such generated partial keys are outputted from the encryption key generation apparatus 400 to the coding means 410. On the other hand, the coding means 410 inputs data read-out from the D/B 110, and generates coded data (a codestream of packet group to be delivered) by coding each of packets constituting the read-out data using such partial keys. Then, the delivery server 100 delivers coded data generated to the PC 200 (delivery requestor) together with the master key for generating partial keys to be used in a coding process, through the network 300. The concrete data coding is executed by the controller 220 (FIG. 2A) in the delivery server 100. Namely, the controller 220 functions as coding means 410 by executing the program 231 preliminarily stored in the memory 230.

Figure 7:
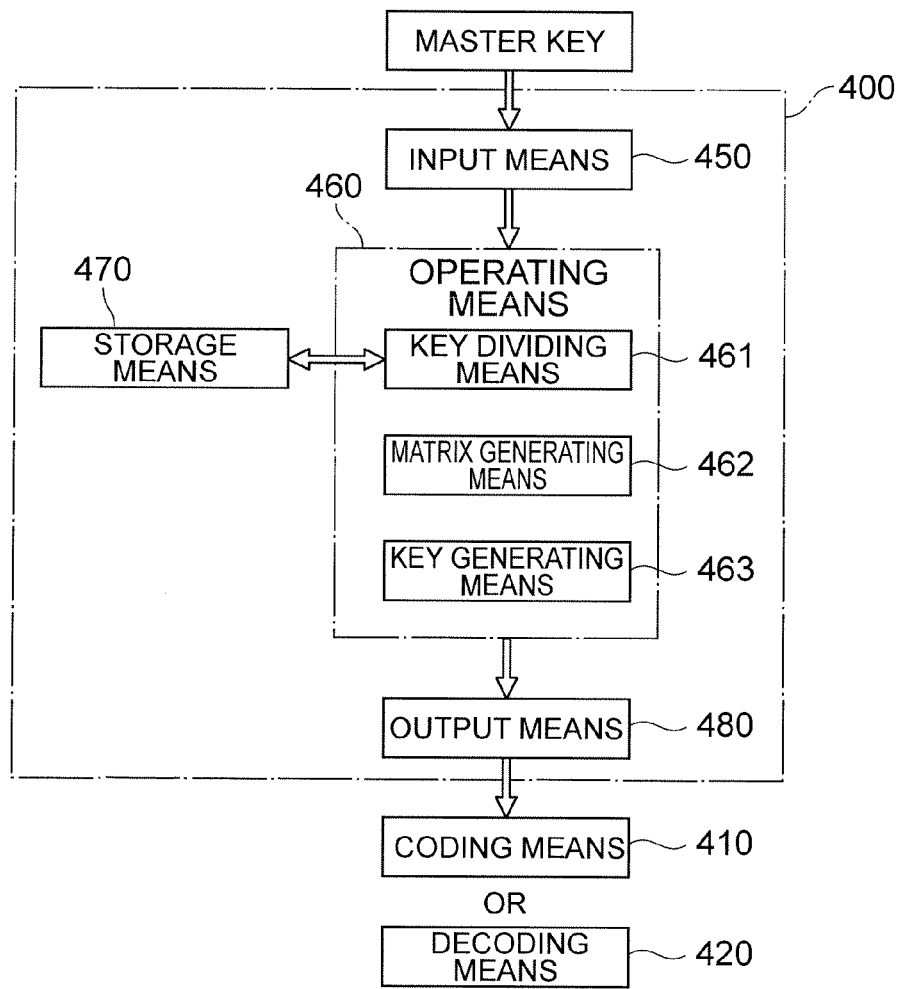
FIG. 7 is a logical block diagram for explaining a structure of the encryption key generating apparatus according to the present invention.

In the PC 200, the coded data and master key, delivered through the network 300, are taken in by the I/O 210 and stored in the memory 230. The encryption key generation apparatus 400 (encryption key generation apparatus according to the present invention) in the PC 200 inputs the master key stored in the memory 230, and generates partial keys for decoding (partial keys respectively corresponding to higher hierarchies at higher positions than the hierarchy corresponding to the master key) using this master key. Also, the encryption key generation apparatus 400 outputs these decryption keys generated to the decoding means 420. The decoding means 420 inputs the coded data read-out from the memory 230, and generates decoded data by decoding each of coded packets using a corresponding decryption key of the decryption keys outputted from the encryption key generation apparatus 400. The concrete data decoding is executed by the controller 220 (FIG. 2A) in the PC 200. Namely, the controller 220 functions as decoding means 420 by executing the program 231 preliminarily stored in the memory 230.

the encryption key generation apparatus according to the present invention corresponds to the encryption key generation apparatus 400 in FIG. 6 when being applied to the delivery system of FIG. 1, and concretely comprises the structure shown in FIG. 7. FIG. 7 is a logical block diagram for explaining a structure of the encryption key generating apparatus according to the present invention.

Namely, the encryption key generation apparatus 400, as shown in FIG. 7, comprises input means 450 for taking in the master key, operating means 460 for partial keys using the master key, storage means 470 for temporarily storing the master key and the operation results in the operating means 460, and output means 480 for outputting, out of the partial keys generated, the partial key of the hierarchy corresponding to the contracted service level to the coding means 410 and the decoding means 420. The operating means 460 is constituted by the key dividing means 461, the matrix generating means 461, and the key generating means 463.

As applying the above-mentioned logical configuration to the hardware configuration, the I/O 210 functions as the input means 450 and the output means 480. The memory 230 functions as the storage means 470. The controller 220 functions as the operating means 460. By executing the program 231 preliminarily stored in the memory 230, the controller 220 functions as the key dividing means 461, the matrix generating means 462, and the key generating means 463.

First Embodiment

Figure 8:
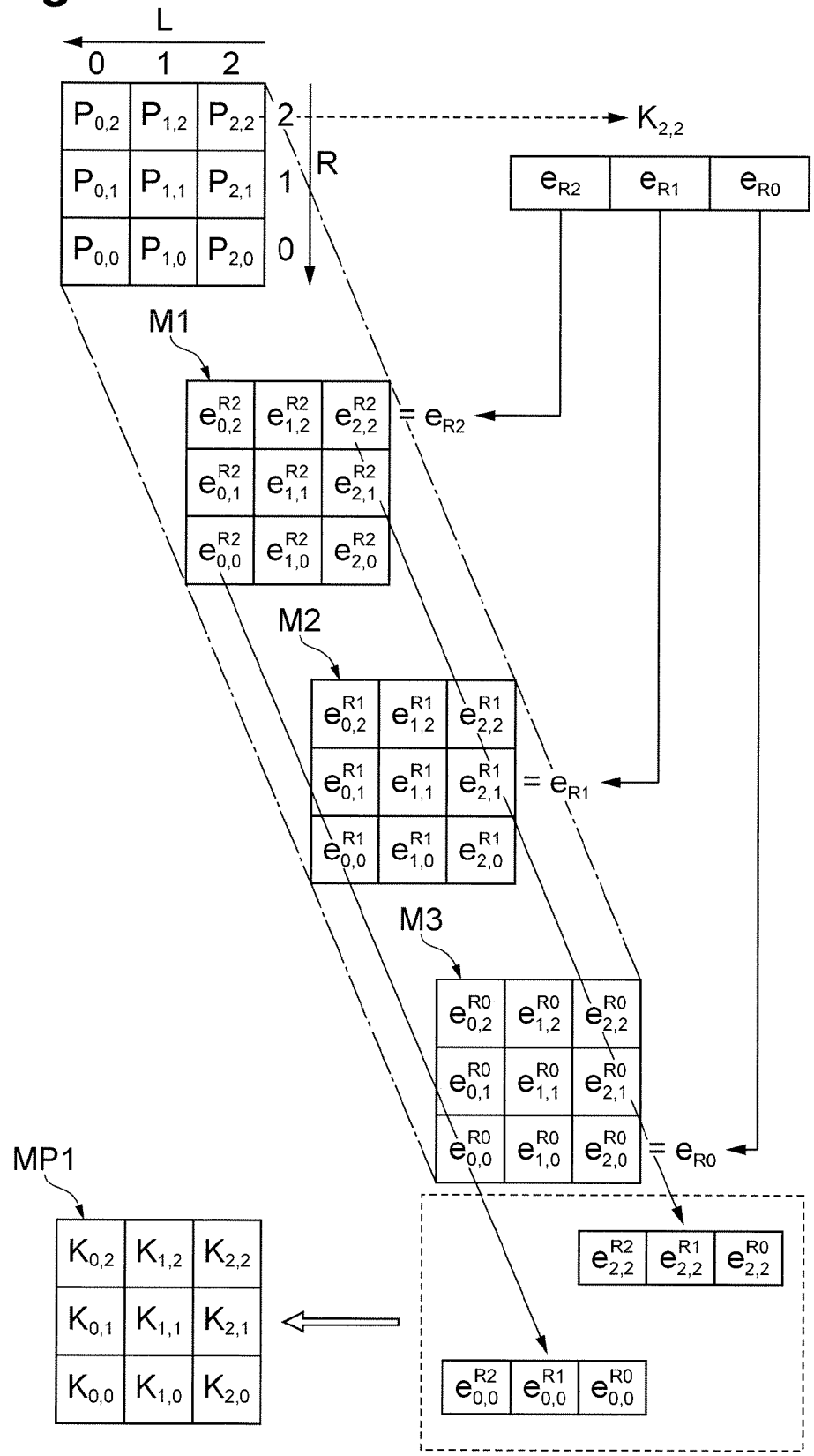
FIG. 8 is a conceptual diagram for explaining an encryption generating operation (encryption key generating method according to the first embodiment) executed in a first embodiment of the encryption key generating apparatus according to the present invention.
Figure 9:
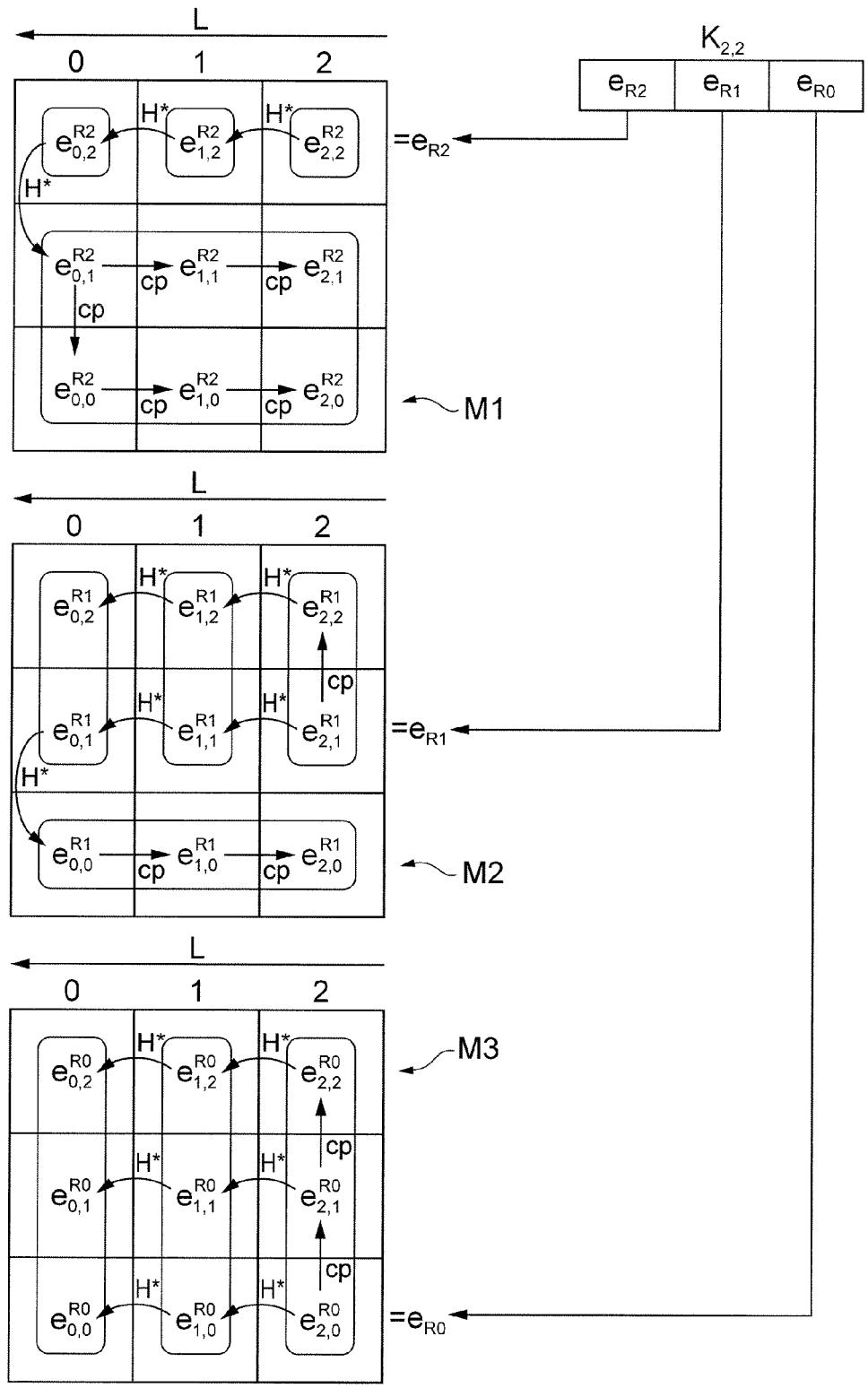
FIG. 9 is a conceptual diagram for explaining generation of key element matrices by the matrix generating means in the encryption key generating apparatus according to the first embodiment.

The encryption key generating operation (encryption key generating method according to the first embodiment) executed in the first embodiment of the encryption key generating apparatus according to the present invention will be described below. The encryption key generating apparatus according to the first embodiment has the structure shown in FIG. 7, and is realized with a hardware configuration concretely shown in FIG. 2A. In this first embodiment, scalabilities as access control targets are scalability L (layer) and scalability R (resolution level), the number of hierarchies $N_L$ in scalability L is 3, and the number of hierarchies $N_R$ in scalability R is 3. At this time, packets in the respective hierarchies in scalabilities L and R are handled as 3×3 matrix entries $P_{i,j}$ (i=0, 1, 2; j=0, 1, 2). FIG. 8 is a conceptual diagram for explaining an encryption generating operation (operation of the operating means 460) executed in the first embodiment of the encryption key generating apparatus according to the present invention. FIG. 9 is a conceptual diagram for explaining generation of key element matrices by the matrix generating means 462 in the encryption key generating method of the first embodiment.

A master key is a partial key being in the D/B 110 by the input means 450 or delivered through the network 300, and is stored in the storage means 470. Namely, the master key is a partial key corresponding to the lowest packet preliminarily managed by the storage means 470 and in the example of FIG. 8, the master key is a partial key $K_{2,2}$ corresponding to the packet $P_{2,2}$ in the hierarchies at the lowest position in each of scalabilities L and R. The key dividing means 461 divides this master key $K_{2,2}$ is divided by a smaller value (=min($N_L$,$N_R$)) out of the hierarchy number $N_L$ of scalability L and the hierarchy number $N_R$ of scalability R.

Since in this first embodiment $N_L$=$N_R$=3, either of scalabilities L and R can be selected, and it is assumed as an example herein that the key dividing means 461 selects scalability R as a reference scalability. At this time, the key dividing means 461 divides the master key $K_{2,2}$ by the minimum hierarchy number 3 (the number of hierarchies in scalability R) to obtain split keys $e_{R2}$, $e_{R1}$, and $e_{R0}$. These split keys $e_{R2}$, $e_{R1}$, and $e_{R0}$ are root keys (keys for generation of respective matrix entries) corresponding to the respective hierarchies of scalability R, and the matrix generating means 462 generates key element matrices M1-M3 for the respective hierarchies of scalability R.

Matrix entries in the respective key element matrices M1-M3 are sequentially generated from the split keys $e_{R2}$, $e_{R1}$, and $e_{R0}$ being the corresponding root keys, as shown in FIG. 9.

First, in the key element matrix M1, as a matrix corresponding to the hierarchical level 2 (lowest hierarchy) of scalability R, the split key $e_{R2}$ is assigned to the (2,2) entry. In the drawing, superscript R2 to each matrix entry e represents the hierarchical level of scalability R (reference scalability) corresponding to the key element matrix M1 and each subscript represents coordinates of an entry in the key element matrix M1. In this first embodiment, the entries in the key element matrix M1 will be denoted below by $e^{R2}(i,j)$ (i=0, 1, 2; j=0, 1, 2).

Coordinate entries $e^{R2}(1,2)$ and $e^{R2}(0,2)$ corresponding to the respective remaining hierarchies in scalability L in the hierarchy (hierarchical level=2) in scalability R corresponding to the split key $e_{R2}$ are assigned operation data successively obtained by repeating a hash operation on the split key $e_{R2}$ using a one-way hash function $H^*$. Namely, $e^{R2}(1,2)$ is assigned the operation data of $H^*(e^{R2}(2,2))$ and the entry $e^{R2}(0,2)$ is assigned the operation data of $H^{*2}(e^{R2}(2,2))$. This matrix operation procedure maintains the hierarchical nature of scalability L, for the hierarchical level 2 of scalability R. In this specification, the operation of n (n=2, 3, . . . ) repetitions with one-way hash function $H^*$ is denoted by $H^{*n}$.

On the other hand, in the key element matrix M1, all the entries $e^{R2}(i,j)$ (i=0, 1, 2; j=0, 1) in the higher hierarchies than the hierarchical level 2 of scalability R are assigned operation data $H^*(e^{R2}(0,2))$(=$H^{*3}(e^{R2}(2,2))$) obtained by further carrying out the hash operation with the one-way hash function $H^*$ on the entry $e^{R2}(0,2)$. The operation data at this time is a value corresponding to a packet with the hierarchy number of scalability L being −1 (which is nonexistent in fact).

The key element matrix M1 generated as described above enables the access control to the packets $P_{i,2}$ (i=0, 1, 2), while maintaining the hierarchical nature of scalability L.

In the key element matrix M2, as a matrix corresponding to the hierarchical level 1 of scalability R, the split key $e_{R1}$ is assigned to the (2,1) entry. In this first embodiment, the entries in the key element matrix M2 will be denoted below by $e^{R1}(i,j)$ (i=0, 1, 2; j=0, 1, 2).

Operation data of $H^*(e^{R1}(2,1))$ is assigned to the coordinate entry $e^{R1}(1,1)$ and operation data of $H^{*2}(e^{R1}(2,1))$ to the entry $e^{R1}(0,1)$ corresponding to the respective remaining hierarchies in scalability L in the hierarchy (hierarchical level=1) in scalability R corresponding to the split key $e_{R1}$. This matrix operation procedure maintains the hierarchical nature of scalability L, for the hierarchical level 1 of scalability R.

Furthermore, in the key element matrix M2, all the entries $e^{R1}(i,0)$ (i=0, 1, 2) in the higher hierarchy than the hierarchical level 1 of scalability R are assigned operation data $H^*(e^{R1}(0,1))$(=$H^{*3}(e^{R1}(2,1))$) obtained by further carrying out the hash operation with the one-way hash function $H^*$ on the entry $e^{R1}(0,1)$. The operation data at this time is a value corresponding to a packet with the hierarchy number of scalability L being −1 (which is nonexistent in fact).

On the other hand, in the key element matrix M2, the entries $e^{R1}(i,2)$ (i=0, 1, 2) in the lower hierarchy than the hierarchical level 1 of scalability R are assigned the same values as the corresponding entries $e^{R1}(i,1)$ (i=0, 1, 2). It is synonymous with the following: the entries $e^{R1}(i,2)$ (i=0, 1) are assigned values obtained by successively carrying out the hash operation with the one-way hash function on the entry $e^{R1}(2,2)$ in which the value of entry $e^{R1}(2,1)$ is copied once. In FIG. 9 and others, "CP" means copy.

The key element matrix M2 generated as described above enables the access control to the packets $P_{i,1}$ (i=0, 1, 2), while maintaining the hierarchical nature of scalability L.

Similarly, in the key element matrix M3, as a matrix corresponding to the hierarchical level 0 (highest hierarchy) of scalability R, the split key $e_{R0}$ is assigned to the (2,0) entry. In this first embodiment, the entries in the key element matrices M3 will be denoted below by $e^{R0}(i,j)$ (i=0, 1, 2; j=0, 1, 2).

Operation data of $H^*(e^{R0}(2,0))$ is assigned to the coordinate entry $e^{R0}(1,0)$ and operation data of $H^{*2}(e^{R0}(2,0))$ is assigned to the entry $e^{R0}(0,0)$ corresponding to the respective remaining hierarchies in scalability L in the hierarchy (hierarchical level=0) in scalability R corresponding to the split key $e_{R0}$. This matrix operation procedure maintains the hierarchical nature of scalability L, for the hierarchical level 0 of scalability R.

Furthermore, since there is no higher hierarchy than the hierarchical level 0 of scalability R in the key element matrix M3, no further hash operation is carried out on the entry $e^{R0}(0,0)$.

On the other hand, in the key element matrix M3, the entries $e^{R0}(i,j)$ (i=0, 1, 2; j=1, 2) in the lower hierarchies than the hierarchical level 0 of scalability R are assigned the same values as the corresponding entries $e^{R0}(i,0)$ (i=0, 1, 2). This is synonymous with the following: the entries $e^{R0}(i,j)$ (i=0, 1, 2; j=1, 2) are assigned the values obtained by successively carrying out the hash operation with the one-way hash function on each of the entries $e^{R0}(2,2)$ and $e^{R0}(2,1)$ in which the value of the entry $e^{R0}(2,0)$ is copied once.

In this case, the key element matrix M3 generated also enables the access control to the packets $P_{i,0}$ (i=0, 1, 2), while maintaining the hierarchical nature of scalability L.

Subsequently, the key generating means 463 generates a partial key matrix MP1 by combining the entries coordinately consistent among the key element matrices M1-M3 generated by the matrix generating means 462 as described above. Namely, entries in the partial key matrix MP1 serve as partial keys $K_{i,j}$ (i=0, 1, 2; j=0, 1, 2) corresponding to the respective packets $P_{i,j}$ (i=0, 1, 2; j=0, 1, 2). As described above, for each of the hierarchies of one scalability R (resolution level), the partial keys are generated while maintaining the hierarchical nature of the other scalability L (layer), whereby the hierarchical nature is maintained in the layer and in the resolution level. The output means 480 outputs the partial keys (i=0, 1, 2; j=0, 1, 2) generated by the key generating means 463 as described above, to the coding means 410. The coding means 410 codes the packets $P_{i,j}$ (i=0, 1, 2; j=0, 1, 2) by the respective corresponding partial keys $K_{i,j}$ (i=0, 1, 2; j=0, 1, 2). In this manner, as coded data to be delivered through the network 300, the JPEG2000 packet codestreams thus encrypted are delivered to the PC 200 together with the master key $K_{2,2}$.

Second Embodiment

Figure 10:
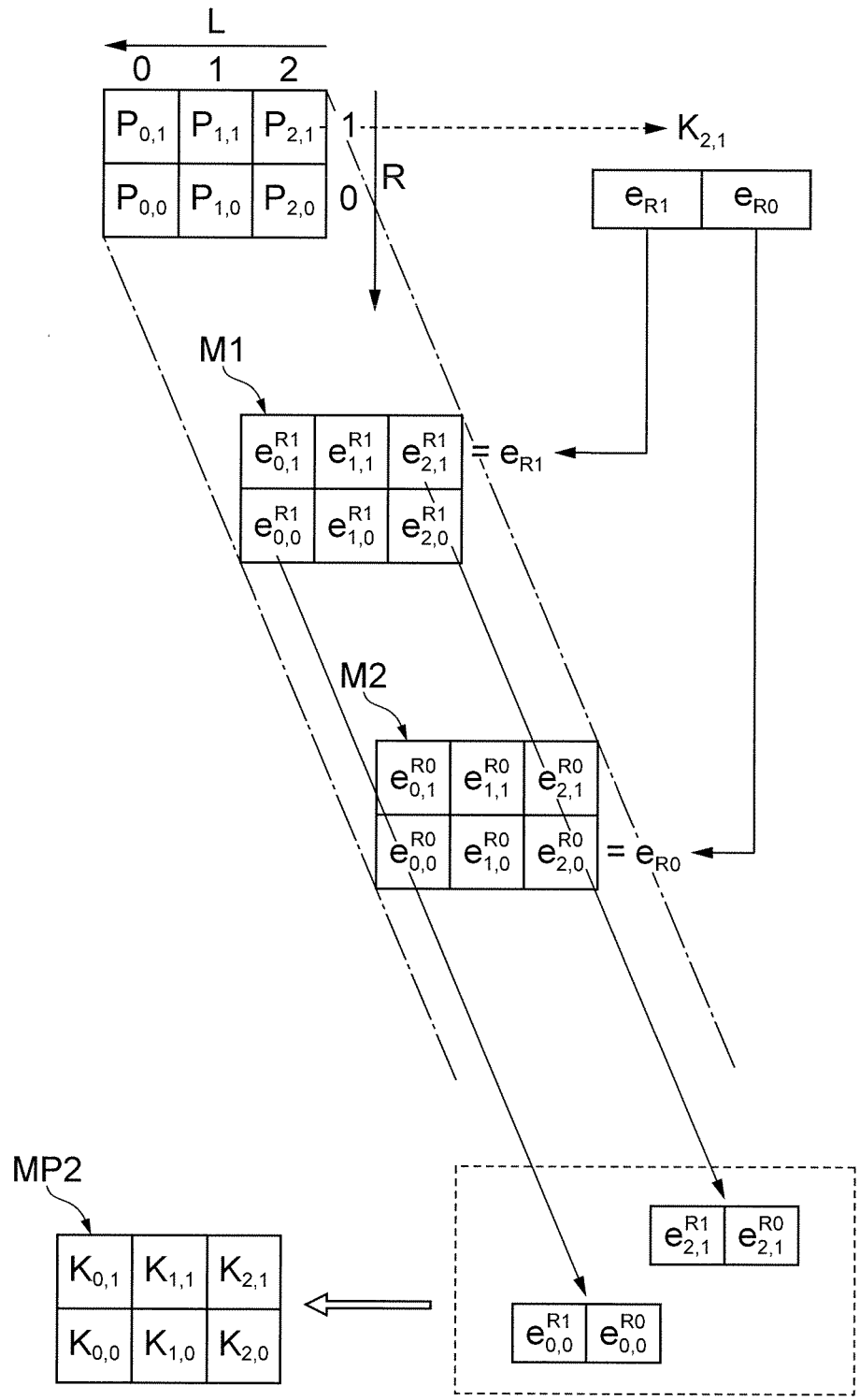
FIG. 10 is a conceptual diagram for explaining an encryption generating operation (encryption key generating method according to the second embodiment) executed in a second embodiment of the encryption key generating apparatus according to the present invention.
Figure 11:
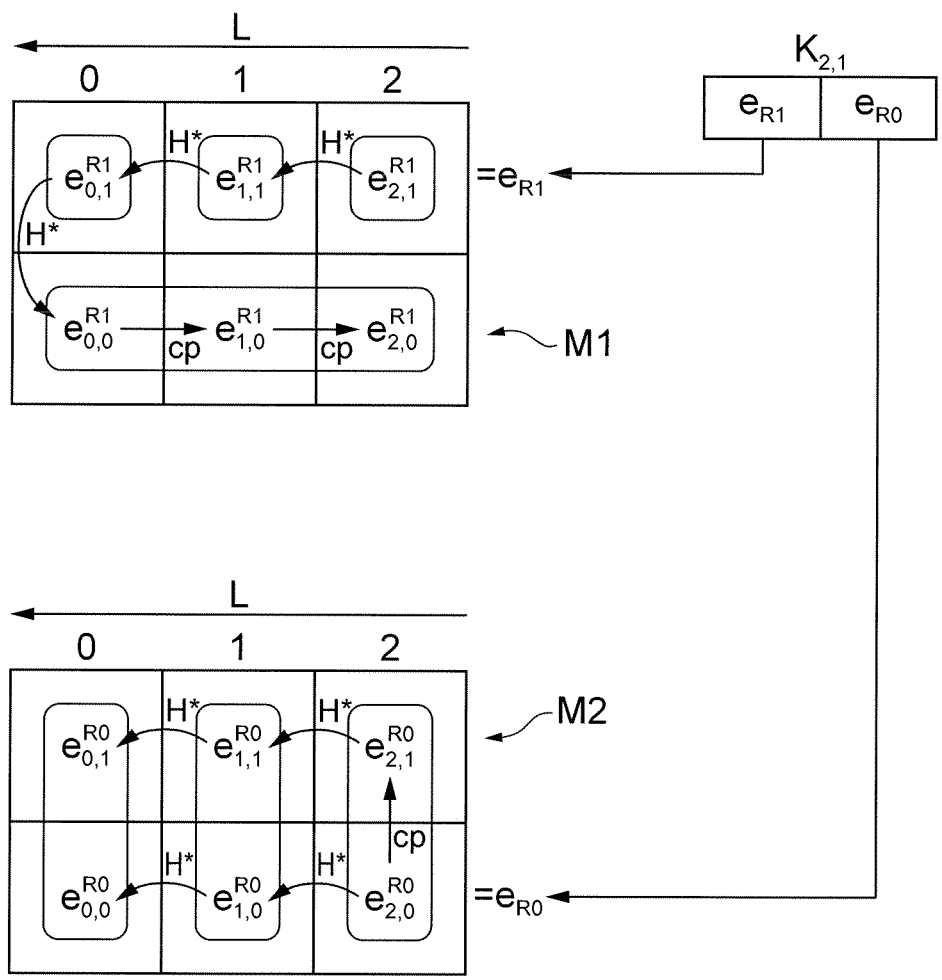
FIG. 11 is a conceptual diagram for explaining generation of key element matrices by the matrix generating means in the encryption key generating apparatus according to the second embodiment.

The encryption key generating operation (encryption key generating method according to the second embodiment) executed in the second embodiment of the encryption key generating apparatus according to the present invention will be described below. The encryption key generating apparatus according to the second embodiment, similar to the first embodiment, has the structure shown in FIG. 7, and is realized with a hardware configuration concretely shown in FIG. 2A. In this second embodiment, scalabilities as access control targets are scalability L (layer) and scalability R (resolution level), the number of hierarchies $N_L$ in scalability L is 3, and the number of hierarchies $N_R$ in scalability R is 2. At this time, packets in respective hierarchies in scalabilities L and R are handled as 3×2 matrix entries $P_{i,j}$ (i=0, 1, 2; j=0, 1). FIG. 10 is a conceptual diagram for explaining the encryption key generating operation (operation of the operating means 460 shown in FIG. 7) executed in the second embodiment of the encryption key generating apparatus according to the present invention. FIG. 11 is a conceptual diagram for explaining generation of key element matrices by the matrix generating means 462 in the encryption key generating apparatus according to the second embodiment.

The master key is a partial key delivered by the input means 450 through the D/B 110 or the network 300, and is stored temporarily stored in the storage means 470. Namely, the master key is a partial key corresponding to the lowest packet preliminarily managed by the storage means 470 and in the example of FIG. 10, it is an encryption key $K_{2,1}$ corresponding to the packet $P_{2,1}$ in the hierarchies at the lowest position in each of scalabilities L and R. This master key $K_{2,1}$ is, by the key dividing means 461, divided by a smaller value (=min$(N_L, N_R)$) out of the hierarchy number $N_L$ of scalability L and the hierarchy number $N_R$ of scalability R. Specifically, the key dividing means 461 divides the master key $K_{2,1}$ by the hierarchy number of scalability R (minimum hierarchy number 2) to obtain split keys $e_{R1}$ and $e_{R0}$. These split keys $e_{R1}$, $e_{R0}$ are root keys corresponding to the respective hierarchies of scalability R and the matrix generating means 462 generates key element matrices M1, M2 for the respective hierarchies of scalability R.

Matrix entries in the respective key element matrices M1, M2 are sequentially generated from the split keys $e_{R1}$, $e_{R0}$ being the corresponding root keys, as shown in FIG. 11.

First, in the key element matrix M1, as a matrix corresponding to the hierarchical level 1 (lowest hierarchy) of scalability R, the split key $e_{R1}$ is assigned to the (2,1) entry. In the drawing, superscript R1 to each matrix entry e represents the hierarchical level of scalability R (reference scalability) corresponding to the key element matrix M1, and each subscript represents coordinates of an entry in the key element matrix M1. In this second embodiment, the entries in the key element matrix M1 will be denoted below by $e^{R1}(i,j)$ (i=0, 1, 2; j=0, 1).

Coordinate entries $e^{R1}(1,1)$ and $e^{R2}(0,1)$ corresponding to the respective remaining hierarchies in scalability L in the hierarchy (hierarchical level=1) in scalability R corresponding to the split key $e_{R1}$ are assigned operation data successively obtained by repeating the hash operation on the split key $e_{R1}$ using the one-way hash function H*. Namely, $e^{R1}(1,1)$ is assigned the operation data of $H^*(e^{R1}(2,1))$ and the entry $e^{R1}(0,1)$ is assigned the operation data of $H^{*2}(e^{R1}(2,1))$ This matrix operation procedure maintains the hierarchical nature of scalability L, for the hierarchical level 1 of scalability R.

On the other hand, in the key element matrix M1, all the entries $e^{R1}(i,0)$ (i=0, 1, 2) in the higher hierarchy than the hierarchical level 1 of scalability R are assigned the operation data $H^*(e^{R1}(0,1))(=H^{*3}(e^{R1}(2,1)))$ obtained by further carrying out the hash operation with the one-way hash function H* on the entry $e^{R1}(0,1)$. The operation data at this time is a value corresponding to a packet with the hierarchy number of scalability L being −1 (which is nonexistent in fact).

The key element matrix M1 generated as described above enables the access control to the packets $P_{i,1}$ (i=0, 1, 2), while maintaining the hierarchical nature of scalability L.

In the key element matrix M2, as a matrix corresponding to the hierarchical level 0 (highest hierarchy) of scalability R, the split key $e_{R0}$ is assigned to the (2,0) entry. In this second embodiment, the entries in the key element matrix M2 will be denoted below by $e^{R0}(i,j)$ (i=0, 1, 2; j=0, 1).

The operation data of $H^*(e^{R0}(2,0))$ is assigned to the coordinate entry $e^{R0}(1,0)$ and the operation data of $H^{*2}(e^{R0}(2,0))$ is assigned to the entry $e^{R0}(0,0)$ corresponding to the respective remaining hierarchies in scalability L in the hierarchy (hierarchical level=0) in scalability R corresponding to the split key $e_{R0}$. This matrix operation procedure maintains the hierarchical nature of scalability L, for the hierarchical level 0 of scalability R.

Furthermore, no further hash operation on the entry $e^{R0}(0,0)$ is carried out because there is no higher hierarchy than the hierarchical level 0 of scalability R in the key element matrix M2.

On the other hand, in the key element matrix M2, the entries $e^{R0}(i,1)$ (i=0, 1, 2) in the lower hierarchy than the hierarchical level 0 of scalability R are assigned the same values as the corresponding entries $e^{R0}(i,0)$ (i=0, 1, 2). This is synonymous with the following: the entries $e^{R0}(i,1)$ (i=0, 1, 2) are assigned values obtained by successively carrying out the hash operation with the one-way hash function on each of the entries $e^{R0}(1,1)$ and $e^{R0}(0,1)$ in which the value of the entry $e^{R0}(2,0)$ is copied once. In FIG. 11, CP represents the copy operation.

In this case, the key element matrix M2 thus generated also enables the access control to the packets $P_{i,0}$ (i=0, 1, 2), while maintaining the hierarchical nature of scalability L. In FIG. 11 and others, "CP" means copy.

Subsequently, the key generating means 463 generates a partial key matrix MP1 by combining the entries coordinately consistent among the key element matrices M1-M3 generated by the matrix generating means 462 as described above. Namely, entries in the partial key matrix MP1 serve as partial keys $K_{i,j}$ (i=0, 1, 2; j=0, 1) corresponding to the respective packets $P_{i,j}$ (i=0, 1, 2; j=0, 1). As described above, for each of the hierarchies of one scalability R (resolution level), the partial keys are generated while maintaining the hierarchical nature of the other scalability L (layer), whereby the hierarchical nature is maintained in the layer and in the resolution level. The output means 480 outputs the partial keys (i=0, 1, 2; j=0, 1) generated by the key generating means 463 as described above, to the coding means 410. The coding means 410 codes the packets $P_{i,j}$ (i=0, 1, 2; j=0, 1) by the respective corresponding partial keys $K_{i,j}$ (i=0, 1, 2; j=0, 1). In this manner, as coded data to be delivered through the network 300, the JPEG2000 packet codestreams thus encrypted are delivered to the PC 200 together with the master key $K_{2,1}$.

Third Embodiment

Figure 12:
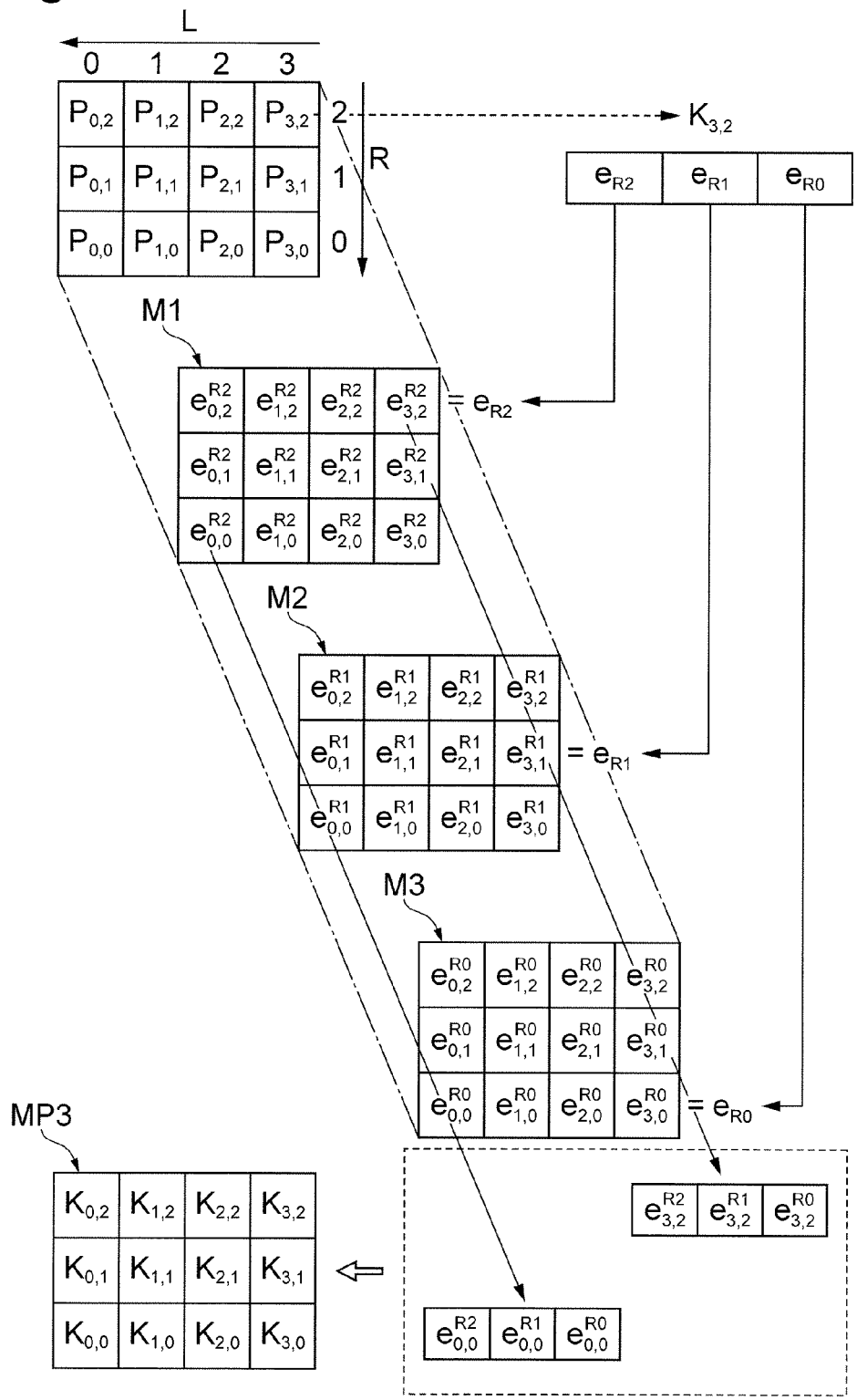
FIG. 12 is a conceptual diagram for explaining an encryption generating operation (encryption key generating method according to the third embodiment) executed in a third embodiment of the encryption key generating apparatus according to the present invention.
Figure 13:
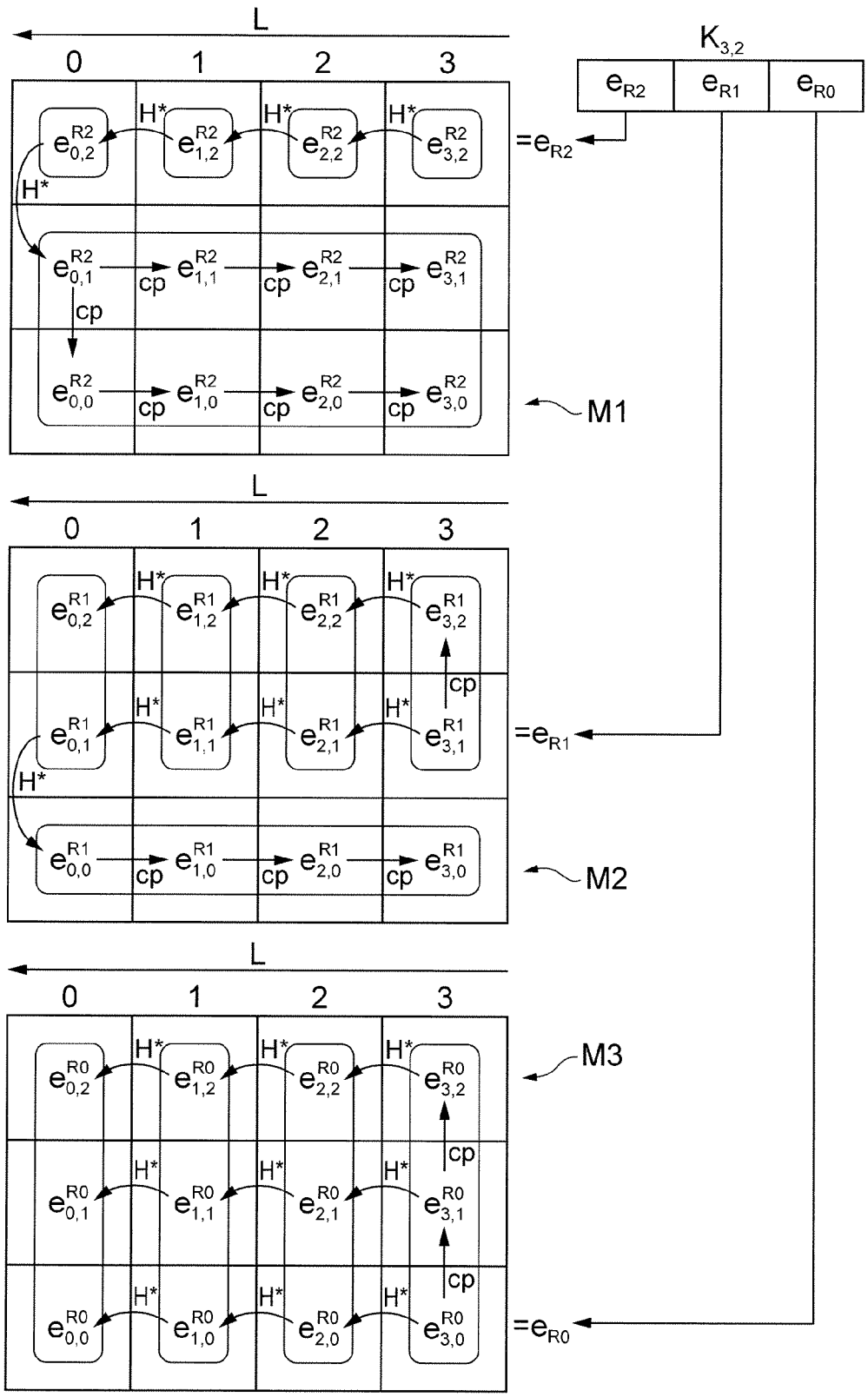
FIG. 13 is a conceptual diagram for explaining generation of key element matrices by the matrix generating means in the encryption key generating apparatus according to the third embodiment.

The encryption key generating operation (encryption key generating method according to the third embodiment) executed in the third embodiment of the encryption key generating apparatus according to the present invention will be described below. The encryption key generating apparatus according to the third embodiment, similar to the first embodiment, has the structure shown in FIG. 7, and is realized with a hardware configuration concretely shown in FIG. 2A. In this third embodiment, the scalabilities as access control targets are scalability L (layer) and scalability R (resolution level), the number of hierarchies $N_L$ in scalability L is 4, and the number of hierarchies $N_R$ in scalability R is 3. At this time, packets in respective hierarchies in scalabilities L and R are handled as 4×3 matrix entries $P_{i,j}$ (i=0, 1, 2; j=0, 1, 2). FIG. 12 is a conceptual diagram for explaining the encryption key generating operation (operation of the operating means 460 shown in FIG. 7) executed in the third embodiment of the encryption key generating apparatus according to the present invention. FIG. 13 is a conceptual diagram for explaining generation of key element matrices by the matrix generating means 462 in the encryption key generating apparatus according to the third embodiment.

The master key is a partial key delivered by the input means 450 through the D/B 110 or the network 300, and is stored temporarily stored in the storage means 470. Namely, the master key is a partial key corresponding to the lowest packet preliminarily managed by the storage means 470 and in the example of FIG. 12, it is an encryption key $K_{3,2}$ corresponding to the packet $P_{3,2}$ in the hierarchies at the lowest position in each of the scalabilities L and R. This master key $K_{3,2}$ is, by the key dividing means 461, divided by a smaller value (=min ($N_L,N_R$)) out of the hierarchy number $N_L$ of scalability L and the hierarchy number $N_R$ of scalability R. Namely, the key dividing means 461 divides the master key $K_{3,2}$ by the hierarchy number of scalability R (minimum hierarchy number 3) to obtain split keys $e_{R2}$, $e_{R1}$, and $e_{R0}$. These split keys $e_{R2}$, $e_{R1}$, and $e_{R0}$ are root keys corresponding to the respective hierarchies of scalability R and the matrix generating means 462 generates key element matrices M1-M3 for the respective hierarchies of scalability R.

The matrix entries in the respective key element matrices M1-M3 are successively generated from the split keys $e_{R2}$, $e_{R1}$, and $e_{R0}$ being the corresponding root keys, as shown in FIG. 13.

First, in the key element matrix M1, as a matrix corresponding to the hierarchical level 2 (lowest hierarchy) of scalability R, the split key $e_{R2}$ is assigned to the (3,2) entry. In the drawing, superscript R2 to each matrix entry e represents the hierarchical level of scalability R (reference scalability) corresponding to the key element matrix M1, and each subscript represents coordinates of an entry in the key element matrix M1. In this third embodiment, the entries in the key element matrix M1 will be denoted below by $e^{R2}(i,j)$ (i=0, 1, 2, 3; j=0, 1, 2).

The coordinate entries $e^{R2}(2,2)$, $e^{R2}(1,2)$, and $e^{R2}(0,2)$ corresponding to the respective remaining hierarchies in scalability L in the hierarchy (hierarchical level=2) in scalability R corresponding to the split key $e_{R2}$ are assigned operation data successively obtained by repeating the hash operation on the split key $e_{R2}$ using the one-way hash function H*. Specifically, $e^{R2}(2,2)$ is assigned the operation data of H*($e^{R2}(3,2)$), $e^{R2}(1,2)$ is assigned the operation data of H*²($e^{R2}(3,2)$), and the entry $e^{R2}(0,2)$ is assigned the operation data of H*³ ($e^{R2}(3,2)$). This matrix operation procedure maintains the hierarchical nature of scalability L, for the hierarchical level 2 of scalability R.

On the other hand, in the key element matrix M1, all the entries $e^{R2}(i,j)$ (i=0, 1, 2, 3; j=0, 1) in the higher hierarchies than the hierarchical level 2 of scalability R are assigned operation data H*($e^{R2}(0,2)$)(=H*⁴($e^{R2}(3,2)$)) obtained by further carrying out the hash operation with the one-way hash function H* on the entry $e^{R2}(0,2)$. The operation data at this time is a value corresponding to a packet with the hierarchy number of scalability L being −1 (which is nonexistent in fact).

The key element matrix M1 generated as described above enables the access control to the packets $P_{i,2}$ (i=0, 1, 2, 3), while maintaining the hierarchical nature of scalability L.

In the key element matrix M2, as a matrix corresponding to the hierarchical level 1 of scalability R, the split key $e_{R1}$ is assigned to the (3,1) entry. In this third embodiment, the entries in the key element matrix M2 will be denoted below by $e^{R1}(i,j)$ (i=0, 1, 2, 3; j=0, 1, 2).

Operation data of H*($e^{R1}(3,1)$) is assigned to the coordinate entry $e^{R1}(2,1)$, operation data of H*²($e^{R1}(3,1)$) is assigned to the entry $e^{R1}(1,1)$, and operation data of H*³($e^{R1}(3,1)$) is assigned to the entry $e^{R1}(0,1)$, corresponding to the respective remaining hierarchies in scalability L in the hierarchy (hierarchical level=1) in scalability R corresponding to the split key $e_{R1}$. This matrix operation procedure maintains the hierarchical nature of scalability L, for the hierarchical level 1 of scalability R.

Furthermore, in the key element matrix M2, all the entries $e^{R1}(i,0)$ (i=0, 1, 2, 3) in the higher hierarchy than the hierarchical level 1 of scalability R are assigned operation data H*($e^{R1}(0,1)$) H*⁴($e^{R1}(3,1)$)) obtained by further carrying out the hash operation with the one-way hash function H* on the entry $e^{R2}(0,1)$. The operation data at this time is a value corresponding to a packet with the hierarchy number of scalability L being −1 (which is nonexistent in fact).

On the other hand, in the key element matrix M2, the entries $e^{R1}(i,2)$ (i=0, 1, 2, 3) in the lower hierarchy than the hierarchical level 1 of scalability R are assigned the same values as the corresponding entries $e^{R1}(i,1)$ (i=0, 1, 2, 3). This is synonymous with the following: the entries $e^{R1}(i,2)$ (i=0, 1, 2) are assigned values obtained by successively carrying out the hash operation with the one-way hash function on the entry $e^{R1}(3,2)$ in which the value of the entry $e^{R1}(3,1)$ is copied once. In FIG. 13 and others, "CP" means copy.

The key element matrix M2 generated as described above enables the access control to the packets $P_{i,1}$ (i=0, 1, 2, 3), while maintaining the hierarchical nature of scalability L.

Similarly, in the key element matrix M3, as a matrix corresponding to the hierarchical level 0 (highest hierarchy) of scalability R, the split key $e_{R0}$ is assigned to the (3,0) entry. In this third embodiment, the entries in the key element matrix M3 will be denoted below by $e^{R0}(i,j)$ (i=0, 1, 2, 3; j=0, 1, 2).

Operation data of $H^*(e^{R0}(3,0))$ is assigned to the coordinate entry $e^{R0}(2,0)$, operation data of $H^{*2}(e^{R0}(3,0))$ is assigned to the entry $e^{R0}(1,0)$, and operation data of $H^{*3}(e^{R0}(3,0))$ is assigned to the entry $e^{R0}(0,0)$, corresponding to the respective remaining hierarchies in scalability L in the hierarchy (hierarchical level=0) in scalability R corresponding to the split key $e_{R0}$. This matrix operation procedure maintains the hierarchical nature of scalability L, for the hierarchical level 0 of scalability R.

Furthermore, no further hash operation is carried out on the entry $e^{R0}(0,0)$ because there is no higher hierarchy than the hierarchical level 0 of scalability R in the key element matrix M3.

On the other hand, in the key element matrix M3, the entries $e^{R0}(i,j)$ (i=0, 1, 2, 3; j=1, 2) in the lower hierarchies than the hierarchical level 0 of scalability R are assigned the same values as the corresponding entries $e^{R0}(i,0)$ (i=0, 1, 2, 3). This is synonymous with the following: the entries $e^{R0}(i,j)$ (i=0, 1, 2, 3; j=1, 2) are assigned the values obtained by successively carrying out the hash operation with the one-way hash function on each of the entries $e^{R0}(2,2)$ and $e^{R0}(3,1)$ in which the value of entry $e^{R0}(3,0)$ is copied once. In FIG. 13, CP indicates the copy operation.

In this case, the key element matrix M3 thus generated enables the access control to the packets $P_{i,0}$ (i=0, 1, 2, 3), while maintaining the hierarchical nature of scalability L.

Subsequently, the key generating means 463 generates a partial key matrix MP1 by combining the entries coordinately consistent among the key element matrices M1-M3 generated by the matrix generating means 462 as described above. Namely, entries in the partial key matrix MP1 serve as partial keys $K_{i,j}$ (i=0, 1, 2, 3; j=0, 1, 2) corresponding to the respective packets $P_{i,j}$ (i=0, 1, 2, 3; j=0, 1, 2). As described above, for each of the hierarchies of one scalability R (resolution level), the partial keys are generated while maintaining the hierarchical nature of the other scalability L (layer), whereby the hierarchical nature is maintained in the layer and in the resolution level. The output means 480 outputs the partial keys (i=0, 1, 2, 3; j=0, 1, 2) generated by the key generating means 463 as described above, to the coding means 410. The coding means 410 codes the packets $P_{i,j}$ (i=0, 1, 2, 3; j=0, 1, 2) by the respective corresponding partial keys $K_{i,j}$ (i=0, 1, 2, 3; j=0, 1, 2). In this manner, as coded data to be delivered through the network 300, the JPEG2000 packet codestreams thus encrypted are delivered to the PC 200 together with the master key $K_{3,2}$.

(Evaluation of Resistance to Collision Attacks)

In the following, the encryption keys (partial keys corresponding to the packets in the respective hierarchies) generated by the encryption key generating apparatuses and methods of the first to third embodiments configured as described above will be evaluated as to the resistance to collusion attacks.

It is first assumed in this evaluation that data to be coded is JPEG2000 data with scalability L having the hierarchy number $N_L$ and scalability R (resolution level) having the hierarchy number $N_R$.

Partial keys $K_{i,j}$ for the JPEG2000 packets $P_{i,j}$ (i=0, 1, ..., $N_L$−1; j=0, 1, ..., $N_R$−1) are subordinately generated with the one-way hash function H*, using a partial key $K_{NL-1,NR-1}$ for the lowest packet $P_{NL-1,NR-1}$ as a master key. The concepts of superordinate and subordinate of hierarchies are the same as in FIG. 1. Namely, the partial keys $K_{i,j}$ must be subordinately generated from partial keys $K_{a1,b1}$ corresponding to packets $P_{a1,b1}$ (a1=i, i−1, ..., $N_{L-1}$; b1=j, j−1, ..., $N_{R-1}$) in all the hierarchies lower than or identical to the hierarchy of packet $P_{i,j}$ in each of the scalabilities L, R. Under this condition, in order to prevent the partial keys $K_{i,j}$ from being illegally generated by a collusion attack from any partial key $K_{a2,b2}$ corresponding to packet $P_{a2,b2}$ (a2=0, 1, ..., i−1; b2=0, ..., j−1) in a hierarchy at a higher position than packet $P_{i,j}$ in each of the scalabilities L, R, at least one of elements constituting the partial keys $K_{i,j}$ must be an element corresponding to a packet in a lower hierarchy than the partial key $P_{a2,b2}$.

Let us assume, for example, $N_R < N_L$. Elements $e^{Rj}_{i,j}$ in partial key $K_{i,j}$ for all the packets $P_{i,j}$ (i=0, 1, ..., $N_L$−1) in the hierarchy j (0≤j≤$N_R$−1) of scalability R are subordinately generated by the hash operation $H^{*(NL-1-i)}(e_{Rj})$ with the one-way hash function H*, from the element $e_{Rj}$ as a root key. At this time, hash operation values $H^{*(NL-1-i)}(e_{Rj})$ in the higher hierarchy in the key element matrix Mj are directly reflected (or copied) into corresponding elements $e^{Rj}_{i,b1}$ in partial key $K_{i,b1}$ for all packets $P_{i,b1}$ (i=0, 1, ..., $N_L$−1) in a lower hierarchy b1 (<j) of scalability R. On the other hand, a hash operation value $H^{*NL}(e_{Rj})$ is assigned to elements $e^{Rj}_{i,b2}$ in partial key $K_{i,b2}$ for all packets $P_{i,b2}$ (i=0, 1, ..., $N_L$−1) in a higher hierarchy b2 (>j) in scalability R.

For this reason, a partial key in a higher hierarchy is reflected in at least some of elements constituting a partial key in a lower hierarchy, while any elements in a partial key in a lower hierarchy are not reflected in elements constituting a partial key in a higher hierarchy. Namely, the partial keys generated by the encryption key generating method of the present invention do not allow any partial key in a lower hierarchy to be generated from a partial key in a higher hierarchy, and, therefore, they have the resistance to collusion attacks.

(Generation of Encryption Keys in Decryption)

The below will describe generation of encryption keys (partial keys corresponding to respective packets allowed) by the encryption key generation apparatuses and methods according to the present invention, in decryption (decoding). In the foregoing encryption key generating operation (operation of the operating means 460 shown in FIG. 7), each of partial keys in hierarchies at higher positions was subordinately generated from the only managed master key. On the occasion of decryption, namely in a decoding process in the PC 200 in FIG. 7, partial keys in a hierarchy at each higher position are similarly subordinately generated from a master key, but a user (PC 200) receives only a delivered decryption key (master key) for the lowest packet in a packet group authorized to open.

Specifically, in the case of NL=NR=3, as shown in FIG. 3, the PC 200 side, requesting a grayscale picture $Q_{L,R}$ (0≤L≤$N_L$ and 0≤R≤$N_R$) up to scalability L (layer) and scalability R (resolution level), is authorized to open an image with JPEG2000 packet codestream $P_{L,R}$ as the lowest packet (packet in hierarchies at the lowest position in each of the scalabilities L, R) and the input means 450 receives a key $K_{L,R}$ (0≤L≤2 and 0≤R≤2) for the packet. The key $K_{L,R}$ (0≤L≤2 and 0≤R≤2) is stored in the storage means 470. When the user is allowed to view the coded picture $Q_{L,R}$ in FIG. 3, the encryption key generation apparatus 400 generates decryption keys (decoding keys) corresponding to respective packets P in a frame A (($N_L$−R+1)×($N_R$−L+1)) as the master key by making use of the key $K_{L,R}$ corresponding to the coded picture $Q_{L,R}$. In this case, the key element matrices M1-M3 corresponding to split keys $e^{R2}$, $e^{R1}$, and $e^{R0}$ generated from the key $K_{L,R}$ are also ($N_L$−R+1)×($N_R$−L+1) matrices.

The following will explain a case where the user is allowed to view a coded picture $Q_{1,1}$ in FIG. 3. In this case, the key generation in the encryption key generation apparatus 400 corresponds to a part of FIG. 9, and decryption keys (decoding keys) corresponding to respective packets $P_{1,0}$, $P_{0,1}$, and $P_{0,0}$ in the frame A are generated by making use of the key $K_{1,1}$ corresponding to the coded picture $Q_{1,1}$.

For that, in the PC 200 side, the key dividing means 461 divides the partial key $K_{1,1}$, as the master key, stored in the storage means 470 by the number of hierarchies in scalability R (i.e., by three) to generate three split keys $e^{R2}$, $e^{R1}$, and $e^{R0}$.

Subsequently, the matrix generating means 462 generates a key element matrix for each of the three hierarchies in scalability R. Among the three split keys $e^{R2}$, $e^{R1}$, and $e^{R0}$, a split key in a lower corresponding hierarchy of scalability R than the corresponding hierarchy of the received key $K_{1,1}$ is hash operation data with the hierarchical level of the other scalability L being −1. In this case, therefore, the same value as the corresponding partial key is preliminarily assigned to all entries in the key element matrix.

First, in generation of the 2×2 key element matrix M1 corresponding to the hierarchy 2 of scalability R, the partial key $e^{R2}$ is hash operation data corresponding to the hierarchy −1 of scalability L. Namely, since the hierarchy (hierarchical level: 2) corresponding to the split key $e^{R2}$ of scalability R is lower than the hierarchy (hierarchical level: 1) of scalability R corresponding to the master key $K_{1,1}$, the value of the split key $e^{R2}$ is the hash operation value with the hierarchical level of scalability L being −1. In this case, the same value as the split key $e^{R2}$ (with the hierarchical level of scalability L being −1) is assigned to all the matrix entries $e^{R2}(0,1)$, $e^{R2}(1,1)$, $e^{R2}(0,0)$, and $e^{R2}(1,0)$ in the 2×2 key matrix M1 corresponding to the split key $e^{R2}$.

Next, in generation of the 2×2 key element matrix M2 corresponding to the hierarchy 1 of scalability R, the value of the split key $e^{R1}$ is first assigned to the $e^{R1}(1,1)$ entry. The entry $e^{R1}(0,1)$ in the higher hierarchy of scalability L is assigned operation data $H^*(e^{R1}(1,1))$ of the hash operation with the one-way hash function $H^*$. Furthermore, hash operation data $H^{*2}(e^{R2}(1,1))$ with the hierarchical level of scalability L: −1 is assigned to each of the entries $e^{R1}(1,0)$ and $e^{R1}(0,0)$ corresponding to the higher hierarchy (hierarchical level: 0) than the hierarchy (hierarchical level: 1) corresponding to the split key $e^{R1}$ in scalability R. Conversely, no hash operation is carried out because there is no lower hierarchy (hierarchical level: 2) than the hierarchy (hierarchical level: 1) corresponding to the split key $e^{R1}$ in scalability R.

On the other hand, in generation of the 2×2 key element matrix M3 corresponding to the hierarchy 0 of scalability R, there is no higher hierarchy (hierarchical level: −1) than the hierarchy (hierarchical level: 0) corresponding to the split key $e^{R0}$ in scalability R. Therefore, the value of the split key $e^{R0}$ is first assigned to the $e^{R0}(1,0)$ entry. The entry $e^{R0}(0,0)$ in the higher hierarchy of scalability L is assigned operation data $H^*(e^{R1}(1,0))$ of the hash operation with the one-way hash function $H^*$. Conversely, for the lower hierarchy (hierarchical level: 1) than the hierarchy (hierarchical level: 0) corresponding to the split key $e^{R0}$ in scalability R, the value of the entry $e^{R0}(1,0)$ is copied into the $e^{R0}(1,1)$ entry and the hash operation is successively carried out based on this copy value. Namely, the entry $e^{R0}(0,1)$ in the higher hierarchy of scalability L is assigned operation data $H^*(e^{R0}(1,1))$ of the hash operation with the one-way hash function $H^*$.

By combining the entries coordinately consistent among the 2×2 key element matrices M1-M3 corresponding to the respective hierarchies of scalability R generated by the matrix generating means 462 as described above, the key generating means 463 generates decryption keys $K_{1,0}$, $K_{0,1}$, $K_{0,0}$ corresponding to the packets $P_{1,0}$, $P_{0,1}$, $P_{0,0}$ from the master key $K_{1,1}$.

As described above, a partial key for a certain packet is not generated from a packet in a higher hierarchy in at least one scalability than the packet of interest, but can be generated from any packet in an equivalent or lower hierarchy in each of scalabilities. For this reason, the partial keys have the resistance to collusion attacks.

Fourth Embodiment

Figure 14:
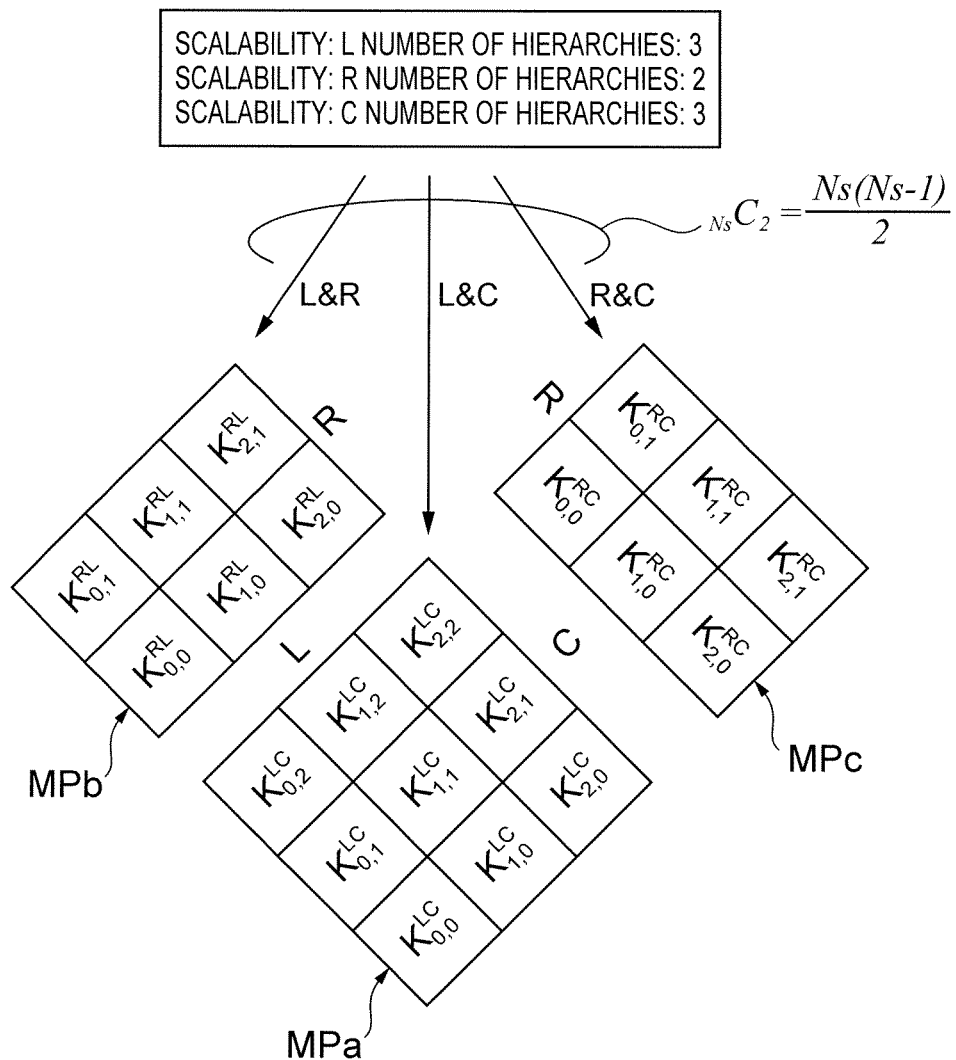
FIG. 14 is a conceptual diagram for explaining generation of partial keys for digital data with three or more types of hierarchical scalabilities, as an encryption generating operation (encryption key generating method according to the fourth embodiment) executed in a fourth embodiment of the encryption key generating apparatus according to the present invention.
Figures 16A, 16B:
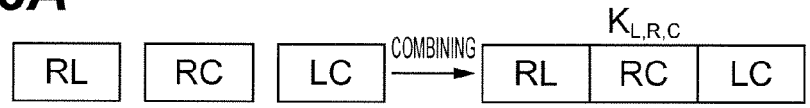
FIGS. 16A and 16B show drawings for explaining an element correspondence relation between partial key element matrices and a partial key matrix in generation of partial keys that are generated by the matrix generating means of the encryption key generating apparatus according to the fourth embodiment.

FIG. 14 is a conceptual diagram for explaining generation of partial keys for digital data with three or more types of hierarchical scalabilities, as the encryption key generating operation executed in the fourth embodiment of the encryption key generating apparatus and method according to the present invention. FIG. 15 is a drawing showing a hierarchy table 11a in the partial key generation of FIG. 14, and a coordinate correspondence relation between partial key element matrices MPa-MPc and a partial key matrix MP4. FIGS. 16A and 16B are drawing for explaining an element correspondence relation between partial key element matrices MPa-MPc and a partial key matrix MP4 in the partial key generation of FIG. 14. The encryption key generating apparatus according to the fourth embodiment, similar to the first embodiment, has the structure shown in FIG. 7, and is realized with a hardware configuration concretely shown in FIG. 2A.

When there are three or more types of scalabilities as access control targets, a first conceivable method is to repeat the aforementioned key generation procedure (operations of the key generating means 461, the matrix generating means 2462, and generating means as a minimum processing unit for combinations of two types of scalabilities. In this case, where the number of scalabilities as access control targets is $N_S$, the number of repetitions of the minimum processing unit is given by $_{NS}C_2(=(N_S(N_S-1))/2)$.

In the example shown in FIG. 14, the encryption keys those corresponding to respective packets in digital data having L (layer) with three hierarchies, R (resolution level) with two hierarchies, and C (component) with three hierarchies, as three types of scalabilities, are generated by the encryption key generating apparatus 400 according to the fourth embodiment. In this case, the following three partial key element matrices are successively generated through much the same operation process as in the above-described first to third embodiments: partial key element matrix MPb (entry $K^{RL}(0,0)$-entry $K^{RL}(2,1)$) for a set of scalabilities R and L; partial key element matrix MPc (entry $K^{RC}(0,0)$-entry $K^{RC}(2,1)$) for a set of scalabilities R and C; partial key element matrix MPa (entry $K^{LC}(0,0)$-entry $K^{LC}(2,2)$) for a set of scalabilities L and C.

On that occasion, as shown in FIG. 15, the matrix generating means 462 generates also the hierarchy table 11a showing all combinations of hierarchical values in scalabilities L, R, and C. This hierarchy table 11a provides a coordinate representation of partial key matrix MP4 whose entries are partial keys corresponding to data units in respective hierarchies in scalabilities L, R, and C, by hierarchical value groups of respective combinations. Furthermore, this hierarchy table 11a shows a relation between types of scalabilities and hierarchical values and it is possible to specify the entries in the partial key element matrices MPa-MPc generated for all the combinations of scalabilities, from this relation. Namely, the matrix generating means 462 generates a partial key element table 11b as a table corresponding to all the combinations of hierarchical values in the hierarchy table 11a.

The key combinations listed in the partial key element table 11b generated in this manner correspond to the hierarchical value combinations in the hierarchy table 11a showing coordinates of respective entries in the partial key matrix MP4.

Each entry $K_{L,R,C}$ (L=0, 1, 2; R=0, 1; C=0, 1, 2) in the partial key matrix MP4 is obtained by combining key elements $K^{RL}_{R,L}$, $K^{RC}_{R,C}$, and $K^{LC}_{L,C}$ constituting one combination in the partial key element table 11b, as shown in FIG. 16A. Therefore, the partial key matrix MP4 is obtained by combining the key elements in the partial key element table 11b corresponding to one combination (cf. FIG. 16B), one by one for all the combinations in the hierarchy table 11a showing the coordinates of respective entries in the partial key matrix MP4.

Each entry in the partial key matrix MP4 generated by the matrix generating means 462 in this manner is an encryption key corresponding to each packet in the digital data having L (layer) with three hierarchies, R (resolution level) with two hierarchies, and C (component) with three hierarchies as the scalabilities. Namely, each entry in the partial key matrix MP4 is a partial key corresponding to a packet specified by hierarchical values of the scalabilities indicating coordinates of the entry.

In cases where there are three or more types of scalabilities as access control targets, the partial keys thus obtained have the resistance to collusion attacks as in the case of two types of scalabilities.

Figure 17A:
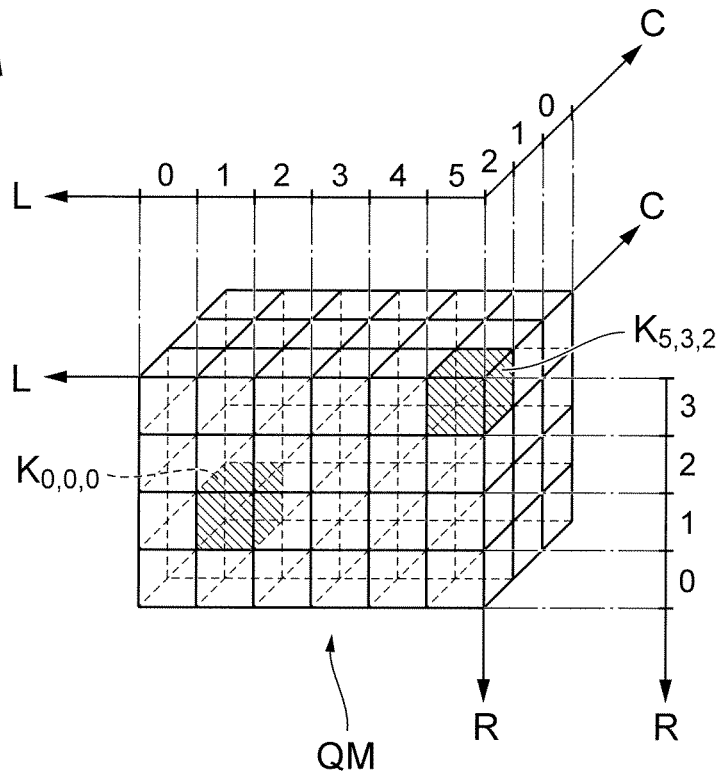
FIGS. 17A and 17B show drawings for explaining a three-dimensional matrix as an example of stereoscopic indication of coordinate entry arrangement in a multidimensional partial key matrix and a multidimensional key element matrix, and an assigning operation of split keys in the encryption key generation (FIG. 14) generalized from the encryption key generating operation executed by the fourth embodiment.
Figure 17B:
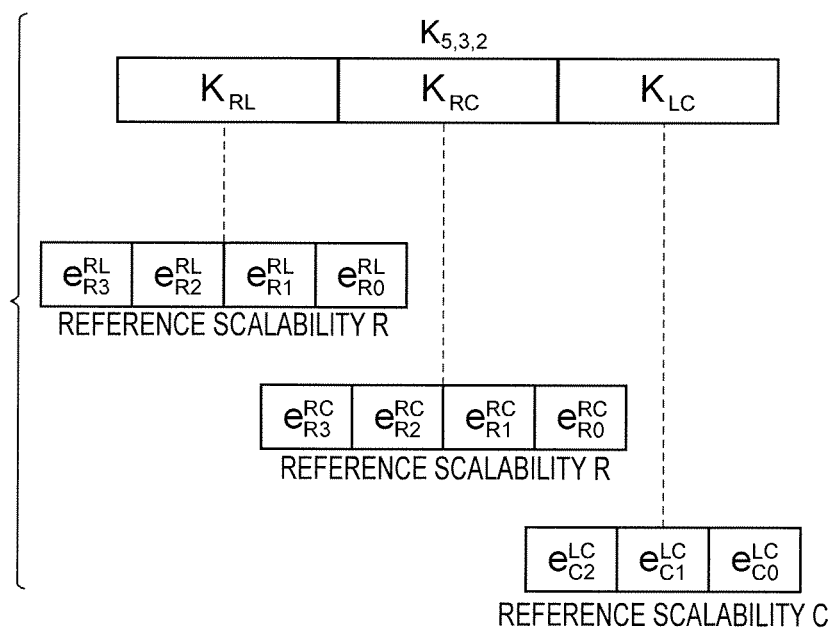

The above encryption key generating operation (encryption key generating method according to the fourth embodiment) executed in the encryption key generating apparatus according to the fourth embodiment was described using the two-dimensional matrix representation as in the first to third embodiments, and the following will explain the encryption key generating operation as a generalized method of the fourth embodiment in a stereoscopic state using a three-dimensional matrix representation. It is assumed in the description below that the access control targets are scalabilities L, R, and C, the number of hierarchies $N_L$ in the scalability L (layer) is 6, the number of hierarchies $N_R$ in the scalability R (resolution level) is 4, and the number of hierarchies $N_c$ in the scalability C (component) is 3. In this case, packets in the respective hierarchies in scalabilities L, R, and C are handled as 6×4×3 matrix entries $P_{i,j,k}$ (i=0, 1, 2, 3, 4, 5; j=0, 1, 2, 3; k=0, 1, 2), as shown in FIG. 17A. FIG. 17A is a stereoscopic representation of arrangement of coordinate entries in a three-dimensional partial key matrix QM (the same also applies to a three-dimensional key element matrix).

As shown in FIG. 17A, a master key is the coordinate entry $K_{5,3,2}$ corresponding to the lowest hierarchies of the respective scalabilities L, R, and C. Furthermore, the coordinate entry $K_{0,0,0}$ is a coordinate entry corresponding to the highest hierarchies of the respective scalabilities L, R, and C.

In the case where the 6×4×3 three-dimensional partial key matrix QM as in FIG. 17A is generated according to the aforementioned encryption key generating method of the fourth embodiment, the lowest partial key $K_{5,3,2}$ is first divided by the number of repetitions, $_{NS}C_2$, of the minimum processing unit carried out for two types of scalabilities, to generate master keys $K_{RL}$, $K_{RC}$, and $K_{LC}$ for the minimum processing unit of each set. Here the master key $K_{RL}$ is a master key for generation of key elements as to the scalabilities L and R. The master key $K_{RC}$ is a master key for generation of key elements as to the scalabilities R and C. Furthermore, the master key $K_{LC}$ is a master key for generation of key elements as to the scalabilities L and C (cf. FIG. 17B).

FIGS. 18A to 18D are drawings for explaining key element generating steps corresponding to the respective hierarchies of scalabilities L and R, using three-dimensional matrices in stereoscopic indication, in the encryption key generating operation as the generalized operation of the fourth embodiment. In the minimum processing unit about scalabilities L and R, the reference scalability is R, and the master key $K_{RL}$ is divided by the hierarchy number 4 of the scalability R to obtain four split keys $e^{RL}_{R3}$, $e^{RL}_{R2}$, $e^{RL}_{R1}$, and $e^{RL}_{R0}$ (cf. FIG. 17B).

First, the split key $e^{RL}_{R3}$ is assigned to the coordinate entry $P_{5,3,2}$ (the hatched portion in FIG. 18A) in the three-dimensional matrix, and then the hash operation on the split key $e^{RL}_{R3}$ using the one-way hash function H is carried out in order from the lowest hierarchy to the highest hierarchy of scalability L. Namely, every time the hash operation is carried out, resultant operation data is assigned to a corresponding coordinate entry (all entries located in a region surrounded by solid lines in FIG. 18A). At this time, operation data $H^{*5}(e^{RL}_{R3})$ is assigned to the coordinate entry corresponding to the highest hierarchy of scalability L. On the other hand, each of coordinate entries (all entries located in a region surrounded by dashed lines in FIG. 18A) except for the coordinate entries $P_{L=0-5, R=3, C=2}$ assigned the operation data is assigned operation data $H^{*6}(e^{RL}_{R3})$ obtained by further carrying out the hash operation with the one-way hash function H on the operation data $H^{*5}(e^{RL}_{R3})$ assigned to the coordinate entry corresponding to the highest hierarchy of scalability L. The above operations generate a three-dimensional key element matrix $QM_{RL1}$.

Subsequently, the split key $e^{RL}_{R2}$ is assigned to the coordinate entry $P_{5,2,2}$ (the hatched portion in FIG. 18B) in the three-dimensional matrix, and then this split key $e^{RL}_{R2}$ is copied (CP) once into the coordinate entry $P_{5,3,2}$. Then, for each of hierarchy 3 and hierarchy 2 of scalability R, the hash operation on the split key $e^{RL}_{R2}$ using the one-way hash function H is carried out in order from the lowest hierarchy to the highest hierarchy of scalability L. Namely, every time the hash operation is carried out, resultant operation data is assigned to a corresponding coordinate entry (all entries located in a region surrounded by solid lines in FIG. 18B). At this time, operation data $H^{*5}(e^{RL}_{R2})$ is assigned to the coordinate entry corresponding to the highest hierarchy of scalability L. On the other hand, each of the coordinate entries (all entries located in a region surrounded by dashed lines in FIG. 18B) except for the coordinate entries $P_{L=0-5, R=2-3, C=2}$ assigned the operation data is assigned operation data $H^{*6}(e^{RL}_{R2})$ obtained by further carrying out the hash operation with the one-way hash function H on the operation data $H^{*5}(e^{RL}_{R2})$ assigned to the coordinate entry corresponding to the highest hierarchy of scalability L. The above operations generate a three-dimensional key element matrix $QM_{RL2}$.

Figure 18A:
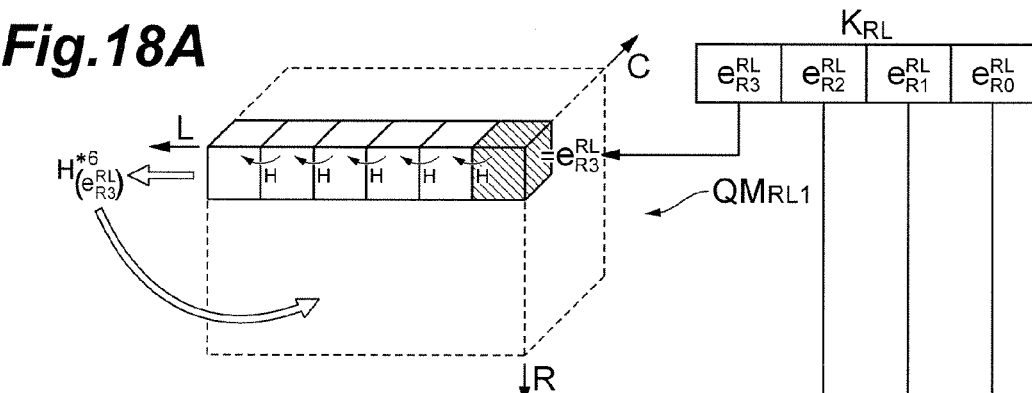
FIGS. 18A to 18D show drawings for explaining key element generating steps corresponding to respective hierarchies of scalabilities L and R, using three-dimensional matrices of stereoscopic indications, in the encryption key generation generalized from the encryption key generating operation executed by the fourth embodiment.
Figure 18B:
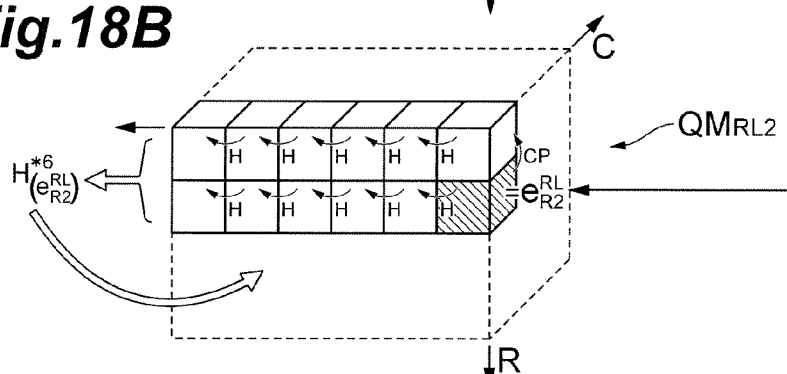
Figure 18C:
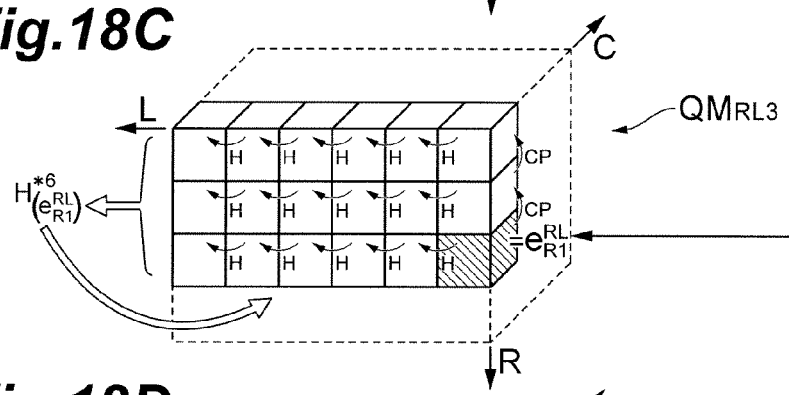
Figure 18D:
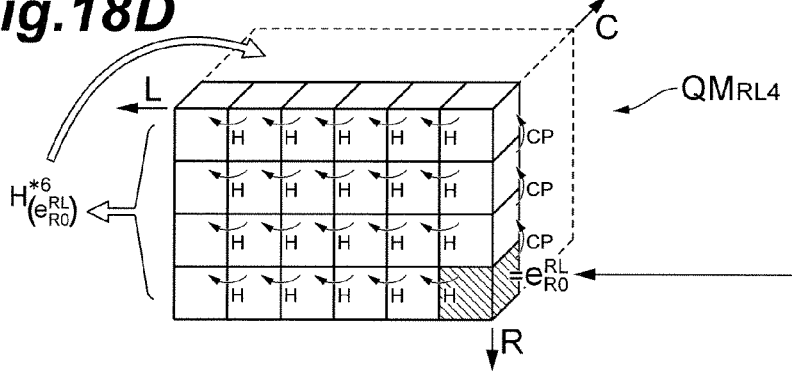

Furthermore, a three-dimensional key element matrix $QM_{RL3}$ shown in FIG. 18C is also generated in the same manner as above by the hash operation on the split key $e^{RL}_{R1}$ (assigned as the coordinate entry $P_{5,1,2}$ indicated by hatching). In FIG. 18C, H indicates the hash operation and CP the copy operation of operation data between coordinate entries. Furthermore, a three-dimensional key element matrix $QM_{RL4}$ is also generated by the hash operation on the split key $e^{RL}_{R0}$ (assigned as the coordinate entry $P_{5,0,2}$ indicated by hatching), as shown in FIG. 18D.

Next, FIGS. 19A to 19D are drawings for explaining key element generating steps corresponding to the respective hierarchies of scalabilities R and C, using a three-dimensional matrix in stereoscopic indication, in the encryption key generating operation as the generalized operation of the fourth embodiment. In the minimum processing unit about the scalabilities R and C, the reference scalability is R, and the master key $K_{RC}$ is divided by the hierarchy number 4 of the scalability R to obtain four split keys $e^{RC}_{R3}$, $e^{RC}_{R2}$, $e^{RC}_{R1}$, and $e^{RC}_{R0}$ (cf. FIG. 17B).

The split key $e^{RC}_{R3}$ is assigned to the coordinate entry $P_{6,4,3}$ (the hatched portion in FIG. 19A) in the three-dimensional matrix, and then the hash operation on the split key $e^{RC}_{R3}$ using the one-way hash function H is carried out in order from the lowest hierarchy to the highest hierarchy of scalability C. Namely, every time the hash operation is carried out, resultant operation data is assigned to a corresponding coordinate entry (all entries located in a region surrounded by solid lines in FIG. 19A). At this time, operation data $H^{*2}(e^{RC}_{R3})$ is assigned to the coordinate entry corresponding to the highest hierarchy of scalability C. On the other hand, each of coordinate entries (all entries located in a region surrounded by dashed lines in FIG. 19A) except for the coordinate entries $P_{L=5,R=3,C=0-2}$ assigned the operation data is assigned operation data $H^{*3}(e^{RC}_{R3})$ obtained by further carrying out the hash operation with the one-way hash function H on the operation data $H^{*2}(e^{RC}_{R3})$ assigned to the coordinate entry corresponding to the highest hierarchy of scalability C. The above operations generate a three-dimensional key element matrix $QM_{RC1}$.

Figure 19A:
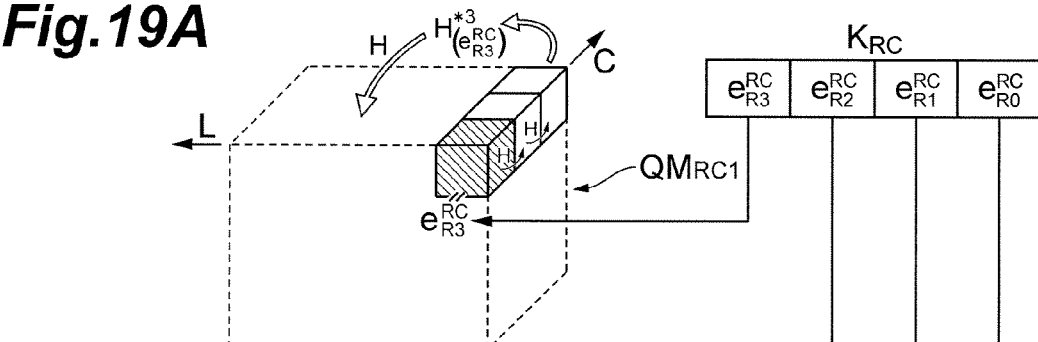
FIGS. 19A to 19D show drawings for explaining key element generating steps corresponding to respective hierarchies of scalabilities R and C, using three-dimensional matrices of stereoscopic indications, in the encryption key generation generalized from the encryption key generating operation executed by the fourth embodiment.
Figure 19B:
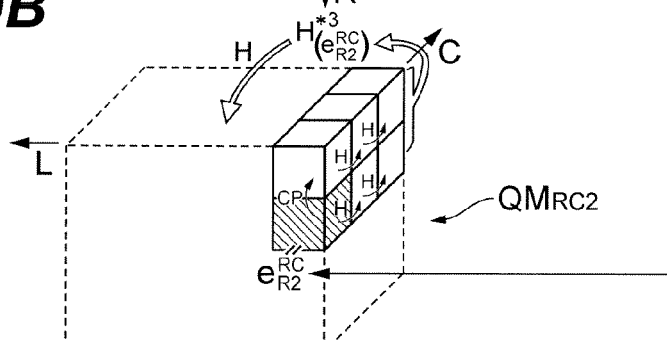
Figure 19C:
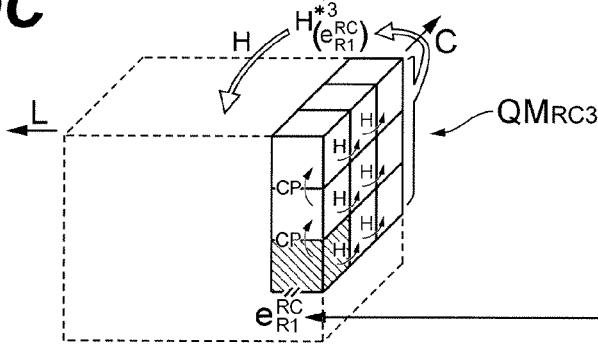
Figure 19D:
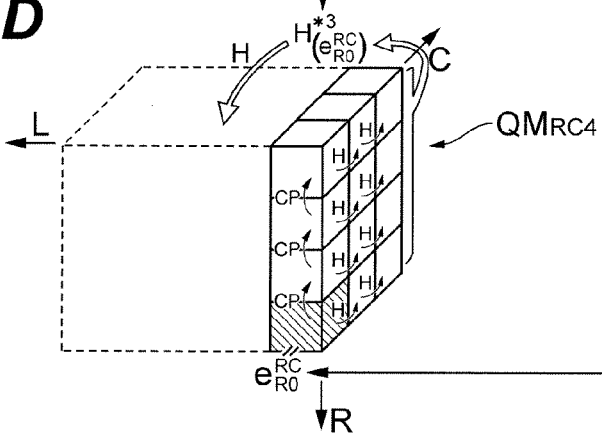

A three-dimensional key element matrix $QM_{RC2}$ shown in FIG. 19B is generated by repeating the copy operation of the split key $e^{RC}_{R2}$ (assigned as the coordinate entry $P_{5,2,2}$ indicated by hatching) into the lower hierarchy than the hierarchy 2 of the reference scalability R, and the hash operation from the lowest hierarchy to the highest hierarchy of scalability C (hash operation on the split key $e^{RC}_{R2}$ using the one-way hash function H). Similarly, a three-dimensional key element matrix $QM_{RC3}$ shown in FIG. 19C is also generated by repeating the copy operation of the split key $e^{RC}_{R1}$ (assigned as the coordinate entry $P_{5,1,2}$ indicated by hatching) into each of the lower hierarchies than the hierarchy 1 of the reference scalability R, and the hash operation from the lowest hierarchy to the highest hierarchy of scalability C (hash operation on the split key $e^{RC}_{R1}$ using the one-way hash function H). Furthermore, a three-dimensional key element matrix $QM_{RC4}$ shown in FIG. 19D is also generated by repeating the copy operation of the split key $e^{RC}_{R0}$ (assigned as the coordinate entry $P_{5,0,2}$ indicated by hatching) into each of the higher hierarchies than the hierarchy 0 (highest hierarchy) of the reference scalability R, and the hash operation from the lowest hierarchy to the lowest hierarchy of scalability C (hash operation on the split key $e^{RC}_{R0}$ using the one-way hash function H).

Figure 20A:
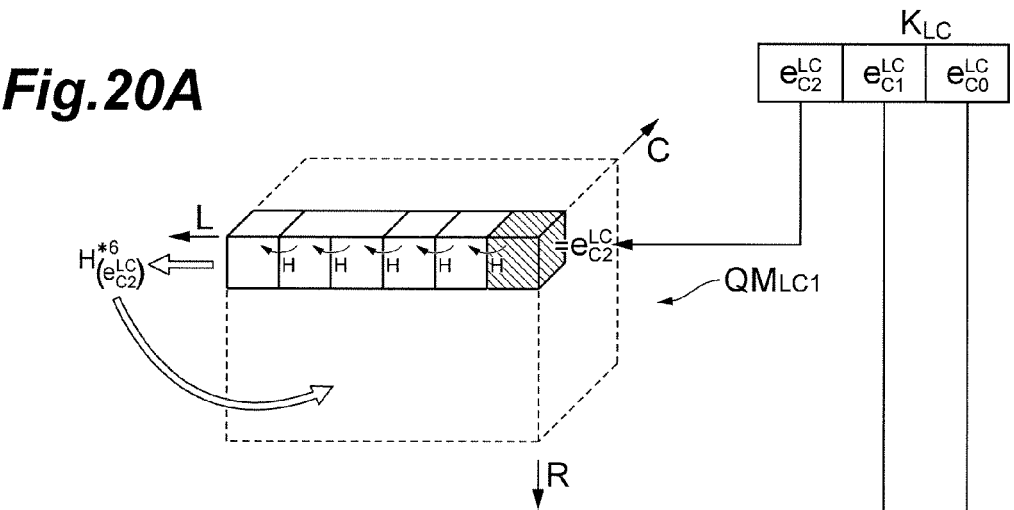
FIGS. 20A to 20C show drawings for explaining key element generating steps corresponding to respective hierarchies of scalabilities L and C, using three-dimensional matrices of stereoscopic indications, in the encryption key generation generalized from the encryption key generating operation executed by the fourth embodiment.
Figure 20B:
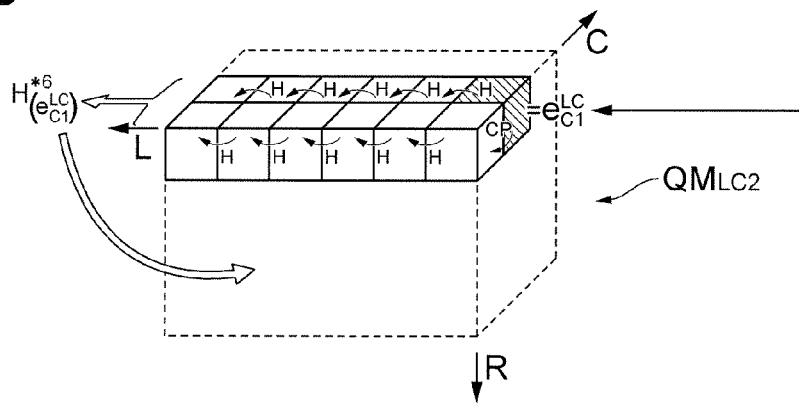
Figure 20C:
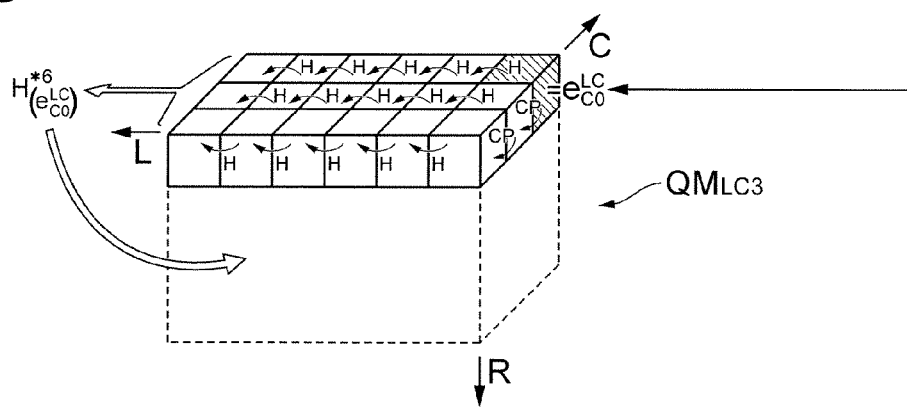

FIGS. 20A to 20C are drawings for explaining key element generating steps corresponding to the respective hierarchies of scalabilities L and C, using a three-dimensional matrix in stereoscopic indication, in the encryption key generating operation as the generalized method of the fourth embodiment. In the minimum processing unit about the scalabilities L and C, the reference scalability is C, and the master key $K_{LC}$ is divided by the hierarchy number 3 of the scalability C to obtain three split keys $e^{LC}_{C2}$, $e^{LC}_{C1}$, and $e^{LC}_{C0}$ (cf. FIG. 17B).

The split key $e^{LC}_{C2}$ is assigned to the coordinate entry $P_{6,4,3}$ (the hatched portion in FIG. 20A) in the three-dimensional matrix, and then the hash operation on the split key $e^{LC}_{C3}$ using the one-way hash function H is carried out in order from the lowest hierarchy to the highest hierarchy of scalability L. Namely, every time the hash operation is carried out, resultant operation data is assigned to a corresponding coordinate entry (all entries located in a region surrounded by solid lines in FIG. 20A). At this time, operation data $H^{*5}(e^{LC}_{C2})$ is assigned to the coordinate entry corresponding to the highest hierarchy of scalability L. On the other hand, each of coordinate entries (all entries located in a region surrounded by dashed lines in FIG. 20A) except for the coordinate entries $P_{L=0-5,R=3,C=2}$ assigned the operation data is assigned operation data $H^{*6}(e^{LC}_{C2})$ obtained by further carrying out the hash operation with the one-way hash function H on the operation data $H^{*5}(e^{LC}_{C2})$ assigned to the coordinate entry corresponding to the highest hierarchy of scalability L. The above operations generate a three-dimensional key element matrix $QM_{LC1}$.

A three-dimensional key element matrix $QM_{LC2}$ shown in FIG. 20B is generated by repeating the copy operation of the split key $e^{LC}_{C1}$ (assigned as the coordinate entry $P_{5,3,1}$ indicated by hatching) into the lower hierarchy than the hierarchy 1 of the reference scalability C, and the hash operation from the lowest hierarchy to the highest hierarchy of scalability L (hash operation on the split key $e^{LC}_{C1}$ using the one-way hash function H). Similarly, a three-dimensional key element matrix $QM_{LC3}$ shown in FIG. 20C is also generated by repeating the copy operation of the split key $e^{LC}_{C0}$ (assigned as the coordinate entry $P_{5,3,0}$ indicated by hatching) into each of the lower hierarchies than the hierarchy 0 (highest hierarchy) of the reference scalability C, and the hash operation from the lowest hierarchy to the highest hierarchy of scalability L (hash operation on the split key $e^{LC}_{C0}$ using the one-way hash function H).

A three-dimensional partial key matrix QM by the encryption key generating operation as the generalized operation of the fourth embodiment is obtained by combining the coordinate entries at the same positions in the three-dimensional key element matrices $QM_{RL1}$-$QM_{RL4}$, $QM_{RC1}$-$QM_{RC4}$, $QM_{LC1}$-$QM_{LC3}$ shown of FIGS. 18A to 20C, which were generated by repetitions of the above-described hash operation.

Fifth Embodiment

Since in the above-described encryption key generating operation executed by the encryption key generating apparatus according to the fourth embodiment the minimum processing unit is definitely the partial key generating procedure with two types of scalabilities, the resultant partial keys are vulnerable to collusion attacks by three or more persons with increase in the number of hierarchies in each scalability (e.g., there are a plurality of coordinate lines with the same partial key in a multidimensional partial key matrix like the three-dimensional partial key matrix QM in FIG. 17A). Therefore, the encryption key generating apparatus and method according to the present invention generates an encryption key with a sufficiently resistant to collusion attacks by three or more persons. The encryption key generating apparatus and method of the fifth embodiment will also be described with reference to the three-dimensional partial key matrix QM shown in FIG. 17a, and it is assumed that the access control targets are scalabilities L, R, and C, the number of hierarchies $N_L$ in the scalability L (layer) is 6, the number of hierarchies $N_R$ in the scalability R (resolution level) is 4, and the number of hierarchies $N_C$ in the scalability C (component) is 3. At this time, packets in respective hierarchies in scalabilities L, R, and C are handled as 6×4×3 matrix entries $P_{i,j,k}$ (i=0, 1, 2, 3, 4, 5; j=0, 1, 2, 3; k=0, 1, 2). The master key prepared is the coordinate entry $K_{5,3,2}$ corresponding to the lowest hierarchies of the respective scalabilities L, R, and C, as shown in FIG. 17A (the coordinate entry $K_{0,0,0}$ is the coordinate entry corresponding to the highest hierarchies of the respective scalabilities L, R, and C). The encryption key generating apparatus according to the fifth embodiment, similar to the first embodiment, has the structure shown in FIG. 7, and is realized with a hardware configuration concretely shown in FIG. 2A. The prepared master key is preliminarily stored in the storage means 470 through the input means 450.

Figure 21:
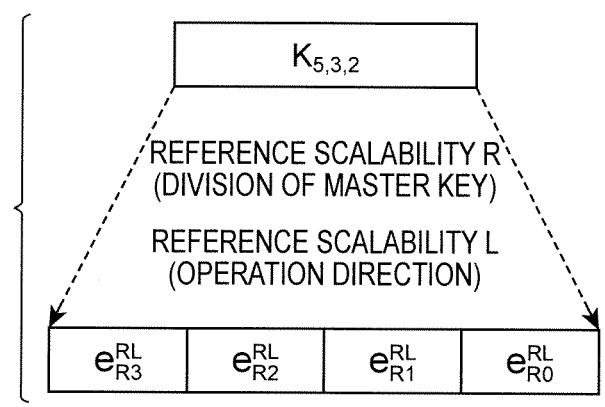
FIG. 21 is a drawing for explaining an example of operation of the key generating means generating split keys from a master key, in the encryption key generating operation (encryption key generating method according to the fifth embodiment) executed in a fifth embodiment of the encryption key generating apparatus according to the present invention.

First, in the encryption key generating operation (encryption key generating method according to the fifth embodiment) executed by the encryption key generating apparatus according to the fifth embodiment, the key dividing means 461 preliminarily sets two types of scalabilities as reference scalabilities out of the three or more types of scalabilities, as shown in FIG. 21. In the example shown in FIG. 21, scalabilities L and R are set as reference scalabilities. Particularly, the reference scalability R (first reference scalability) is a scalability for generating split keys from the master key $K_{5,3,2}$. The key dividing means 461 divides the master key by the hierarchy number 4 of this reference scalability R to generate four split keys $e^{RL}_{R3}$, $e^{RL}_{R2}$, $e^{RL}_{R1}$, and $e^{RL}_{R0}$ corresponding to the respective hierarchies of the reference scalability R. On the other hand, the reference scalability L is a scalability for defining an operation direction of the hash operation with the one-way hash function as described above. FIG. 21 is a drawing for explaining an example of the generation operation (operation of the key dividing means 461 shown in FIG. 7) for the split keys from the master key, in the encryption key generation operation executed in the fifth embodiment of the encryption key generating apparatus and method according to the present invention.

The matrix generating means 462 of the encryption key generating apparatus of the fifth embodiment generates a three-dimensional key element matrix in coordinate representation with hierarchical values in three or more types of scalabilities L, R, C (cf. FIG. 17A) by a series of hash operations corresponding to the respective hierarchies of the reference scalability R, for each hierarchy of the scalability C except for the reference scalabilities L, R. In this fifth embodiment, therefore, with three types of scalabilities L, R, and C (hierarchy number of L: 6; hierarchy number of R: 4; hierarchy number of C: 3), the total packet number given by Mathematical Expression (1) above is 72, and the number of generated three-dimensional key element matrices given by Mathematical Expression (2) above is 12.

FIGS. 22A to 24D are drawings for explaining steps of generating the three-dimensional key element matrices by the encryption key generating method of the fifth embodiment. Particularly, FIGS. 22A to 22D show the three-dimensional key element matrices $QM_{1-1}$, $QM_{2-1}$, $QM_{3-1}$, and $QM_{4-1}$ generated by assigning predetermined coordinate entries the operation data obtained by successively carrying out the hash operation from the lowest hierarchy to the highest hierarchy of scalability L, for the lowest hierarchy (hierarchy 2) of the scalability C other than the reference scalabilities L and R. FIGS. 23A to 23D show the three-dimensional key element matrices $QM_{1-2}$, $QM_{2-2}$, $QM_{3-2}$, and $QM_{4-2}$ generated by assigning predetermined coordinate entries the operation data obtained by successively carrying out the hash operation from the lowest hierarchy to the highest hierarchy of the scalability L, for the hierarchy (hierarchy 1) higher by one hierarchy than the lowest hierarchy of the scalability C other than the reference scalabilities L and R. FIGS. 24A to 24D show the three-dimensional key element matrices $QM_{1-3}$, $QM_{2-3}$, $QM_{3-3}$, and $QM_{4-3}$ generated by assigning predetermined coordinate entries the operation data obtained by successively carrying out the hash operation from the lowest hierarchy to the highest hierarchy of the scalability L, for the highest hierarchy (hierarchy 0) of the scalability C other than the reference scalabilities L and R.

Figure 22A:
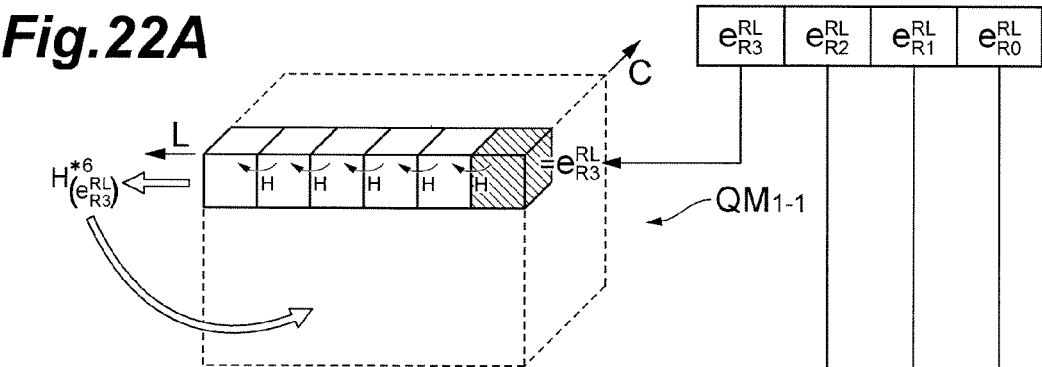
FIGS. 22A to 22D show drawings for explaining generation steps of multidimensional key element matrices by the matrix generating means in the encryption key generating apparatus according to the fifth embodiment (generation of a multidimensional key element matrix group corresponding to the lowest hierarchy of scalability C other than reference scalabilities L and R)

First, FIG. 22A shows the three-dimensional key element matrix $QM_{1-1}$ generated using the split key $e^{RL}_{R3}$ corresponding to the lowest hierarchy of the reference scalability R, for the lowest hierarchy 2 of the scalability C other than the reference scalabilities L and R.

The split key $e^{RL}_{R3}$ is assigned to the coordinate entry $P_{5,3,2}$ (the hatched portion in FIG. 22A) in the three-dimensional matrix, and then the hash operation on the split key $e^{RL}_{R3}$ using the one-way hash function H is carried out in order from the lowest hierarchy to the highest hierarchy of scalability L. Namely, every time the hash operation is carried out, resultant operation data is assigned to a corresponding coordinate entry (all entries located in a region surrounded by solid lines in FIG. 22A). At this time, operation data $H^{*5}(e^{RL}_{R3})$ is assigned to the coordinate entry corresponding to the highest hierarchy of the scalability L. On the other hand, each of the coordinate entries (all entries located in a region surrounded by dashed lines in FIG. 22A) except for the coordinate entries $P_{L=0-5, R=3, C=2}$ assigned the operation data is assigned operation data $H^{*6}(e^{RL}_{R3})$ obtained by further carrying out the hash operation with the one-way hash function H on the operation data $H^{*5}(e^{RL}_{R3})$ assigned to the coordinate entry corresponding to the highest hierarchy of the scalability L. The above operations generate the three-dimensional key element matrix $QM_{1-1}$.

Figure 22B:
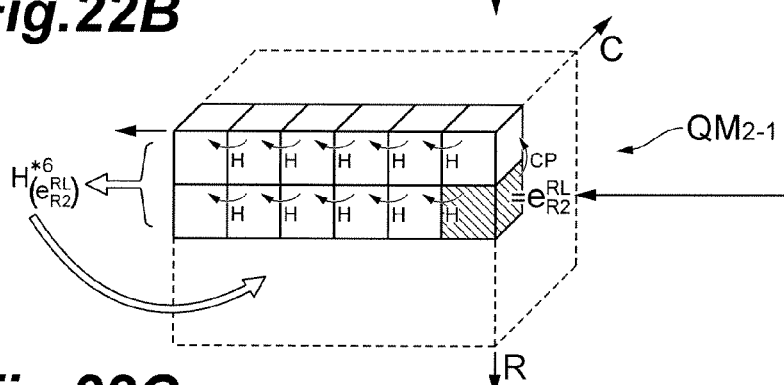

FIG. 22B shows the three-dimensional key element matrix $QM_{2-1}$ generated using the split key $e^{RL}_{R2}$ corresponding to the hierarchy 2 of the reference scalability R (hierarchy higher by one hierarchy than the lowest hierarchy), for the lowest hierarchy 2 of the scalability C other than the reference scalabilities L and R.

In generation of this three-dimensional key element matrix $QM_{2-1}$, the split key $e^{RL}_{R2}$ is assigned to the coordinate entry $P_{5,2,2}$ (the hatched portion in FIG. 22B) in the three-dimensional matrix. At this time, the split key $e^{RL}_{R2}$ is copied (CO) once into the coordinate entry $P_{5,3,2}$. Then, for each of hierarchy 3 and hierarchy 2 of scalability R, the hash operation on the split key $e^{RL}_{R2}$ using the one-way hash function H is carried out in order from the lowest hierarchy to the highest hierarchy of the scalability L. Namely, every time the hash operation is carried out, resultant operation data is assigned to a corresponding coordinate entry (all entries located in a region surrounded by solid lines in FIG. 22B). At this time, operation data $H^{*5}(e^{RL}_{R2})$ is assigned to the coordinate entry corresponding to the highest hierarchy of the scalability L. On the other hand, each of the coordinate entries (all entries located in a region surrounded by dashed lines in FIG. 22B) except for the coordinate entries $P_{L=0-5, R=2-3, C=2}$ assigned the operation data is assigned operation data $H^{*6}(e^{RL}_{R2})$ obtained by further carrying out the hash operation with the one-way hash function H on the operation data $H^{*5}(e^{RL}_{R2})$ assigned to the coordinate entry corresponding to the highest hierarchy of the scalability L. The above operations generate the three-dimensional key element matrix $QM_{2-1}$.

Figure 22C:
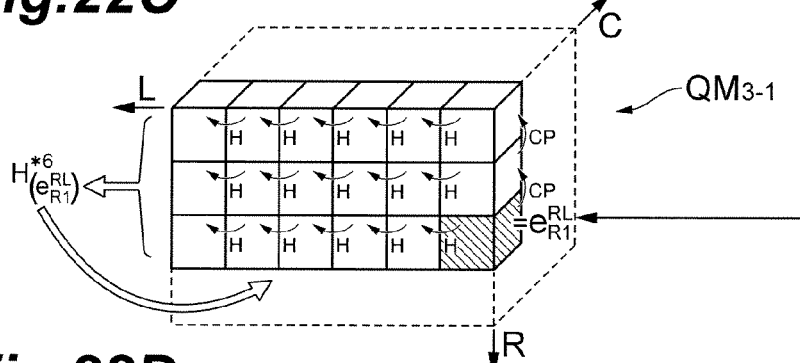
Figure 22D:
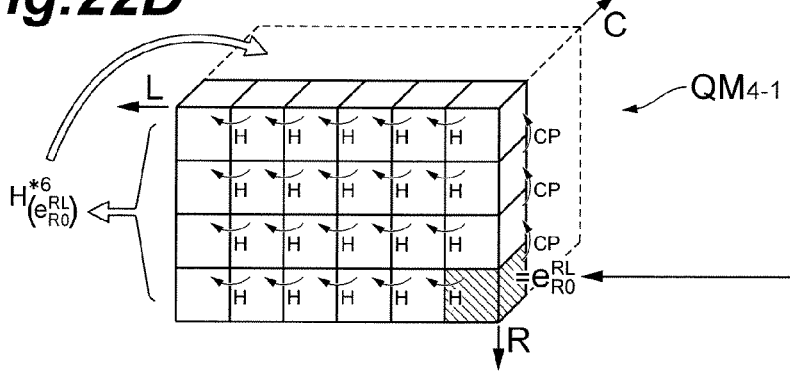

The three-dimensional key element matrix $QM_{3-1}$ shown in FIG. 22C is also generated in the same manner as in the generation of the three-dimensional key element matrices $QM_{1-1}$ and $QM_{2-1}$, by repeating the copy operation of the split key $e^{RL}_{R1}$ (assigned as the coordinate entry $P_{5,1,2}$ indicated by hatching) into each of the lower hierarchies than the hierarchy 1 of the reference scalability R, and the hash operation from the lowest hierarchy to the highest hierarchy of the scalability L (hash operation on the split key $e^{RL}_{R1}$ using the one-way hash function H). Similarly, the three-dimensional key element matrix $QM_{4-1}$ shown in FIG. 22D is also generated by repeating the copy operation of the split key $e^{RL}_{R0}$ (assigned as the coordinate entry $P_{5,0,2}$ indicated by hatching) into each of the lower hierarchies than the hierarchy 0 (highest hierarchy) of the reference scalability C, and the hash operation from the lowest hierarchy to the highest hierarchy of the scalability L (hash operation on the split key $e^{RL}_{R0}$ using the one-way hash function H).

Figure 23A:
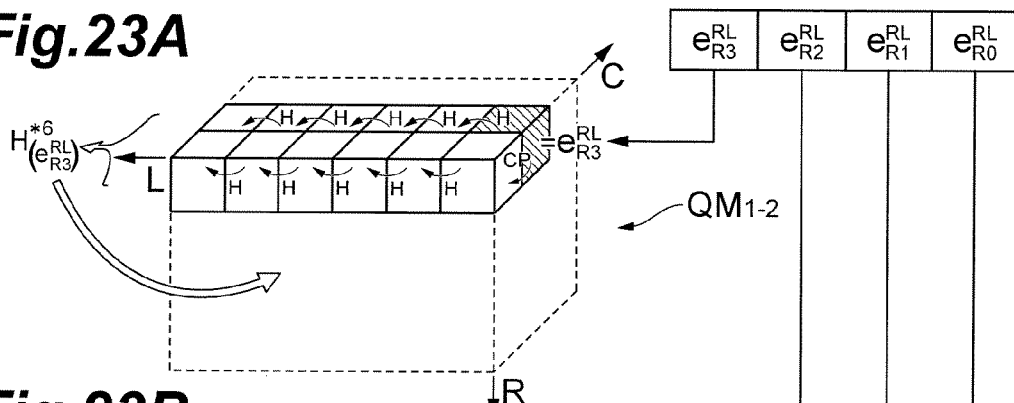
FIGS. 23A to 23D show drawings for explaining generation steps of multidimensional key element matrices by the matrix generating means in the encryption key generating apparatus according to the fifth embodiment (generation of a multidimensional key element matrix group corresponding to a hierarchy higher by one hierarchy than the lowest hierarchy of scalability C other than reference scalabilities L and R)

Next, FIG. 23A shows the three-dimensional key element matrix $QM_{1-2}$ generated using the split key $e^{RL}_{R3}$ corresponding to the lowest hierarchy of the reference scalability R, for the hierarchy 1 (hierarchy higher by one hierarchy than the lowest hierarchy) of the scalability C other than the reference scalabilities L and R.

The split key $e^{RL}_{R3}$ is assigned to the coordinate entry $P_{5,3,1}$ (the hatched portion in FIG. 23A) in the three-dimensional matrix, and then this split key $e^{RL}_{R3}$ is copied (CP) once into the coordinate entry $P_{5,3,1}$. Then, for each of hierarchy 2 (lowest hierarchy) and hierarchy 1 (hierarchy higher by one hierarchy than the lowest hierarchy) of the scalability C, the hash operation on the split key $e^{RL}_{R3}$ using the one-way hash function H is carried out in order from the lowest hierarchy to the highest hierarchy of the scalability L. Namely, every time the hash operation is carried out, resultant operation data is assigned to a corresponding coordinate entry (all entries located in a region surrounded by solid lines in FIG. 23A). At this time, operation data $H^{*5}(e^{RL}_{R3})$ is assigned to each coordinate entry corresponding to the highest hierarchy of the scalability L. On the other hand, each of the coordinate entries (all entries located in a region surrounded by dashed lines in FIG. 23A) except for the coordinate entries $P_{L=0-5,R=3,C=2-3}$ assigned the operation data is assigned operation data $H^{*6}(e^{RL}_{R3})$ obtained by further carrying out the hash operation with the one-way hash function H on the operation data $H^{*5}(e^{RL}_{R3})$ assigned to the coordinate entry corresponding to the highest hierarchy of the scalability L. The above operations generate the three-dimensional key element matrix $QM_{1-2}$.

Figure 23B:
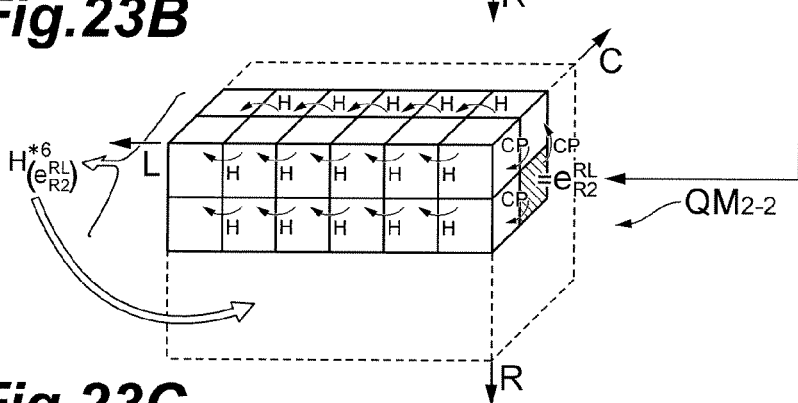

FIG. 23B shows the three-dimensional key element matrix $QM_{2-2}$ generated using the split key $e^{RL}_{R2}$ corresponding to the hierarchy 2 (hierarchy higher by one hierarchy than the lowest hierarchy) of the reference scalability R, for the hierarchy 1 of the scalability C other than the reference scalabilities L and R.

In generation of this three-dimensional key element matrix $QM_{2-2}$, the split key $e^{RL}_{R2}$ is assigned to the coordinate entry $P_{5,2,1}$ (the hatched portion in FIG. 23B) in the three-dimensional matrix. At this time, the split key $e^{RL}_{R2}$ is copied (CP) once into the coordinate entries $P_{5,2-3,1-2}$. Then, for each of hierarchy 3 and hierarchy 2 of the scalability R in hierarchy 2 and hierarchy 1 of the scalability C, the hash operation on the split key $e^{RL}_{R2}$ using the one-way hash function H is carried out in order from the lowest hierarchy to the highest hierarchy of the scalability L. Namely, every time the hash operation is carried out, resultant operation data is assigned to a corresponding coordinate entry (all entries located in a region surrounded by solid lines in FIG. 23B). At this time, operation data $H^{*5}(e^{RL}_{R2})$ is assigned to each coordinate entry corresponding to the highest hierarchy of the scalability L. On the other hand, each of the coordinate entries (all entries located in a region surrounded by dashed lines in FIG. 23B) except for the coordinate entries $P_{L=0-5,R=2-3,C=1-2}$ assigned the operation data is assigned operation data $H^{*6}(e^{RL}_{R2})$ obtained by further carrying out the hash operation with the one-way hash function H on the operation data $H^{*5}(e^{RL}_{R2})$ assigned to the coordinate entry corresponding to the highest hierarchy of the scalability L. The above operations generate the three-dimensional key element matrix $QM_{2-2}$.

Figure 23C:
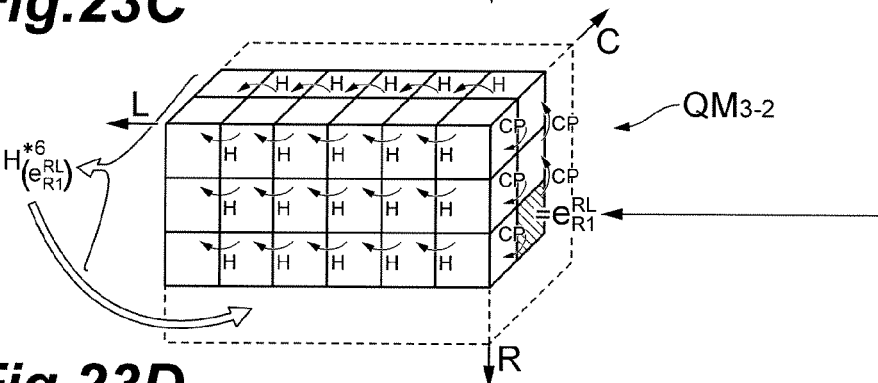
Figure 23D:
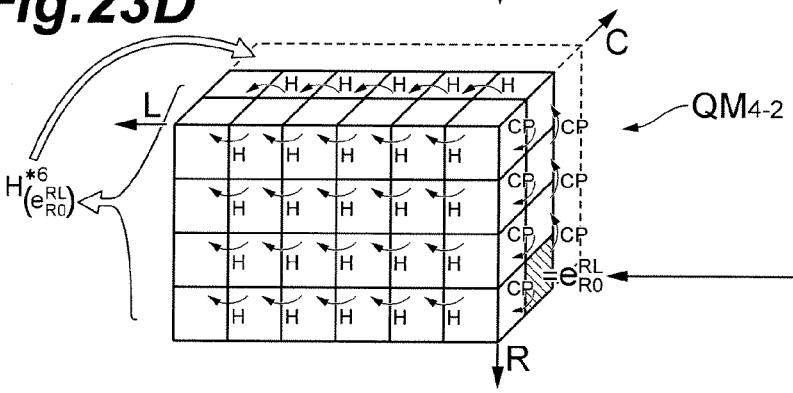

The three-dimensional key element matrix $QM_{3-2}$ shown in FIG. 23C is also generated in the same manner as in the generation of the three-dimensional key element matrices $QM_{1-2}$ and $QM_{2-2}$ described above, by repeating the copy operation of the split key $e^{RL}_{R1}$ (assigned as the coordinate entry $P_{5,1,1}$ indicated by hatching) into each of the lower hierarchies than the hierarchy 1 of the reference scalability R and the lower hierarchy than the hierarchy 1 of the scalability C, and the hash operation from the lowest hierarchy to the highest hierarchy of the scalability L (hash operation on the split key $e^{RL}_{R1}$ using the one-way hash function H). Similarly, the three-dimensional key element matrix $QM_{4-2}$ shown in FIG. 23D is also generated by repeating the copy operation of the split key $e^{RL}_{R0}$ (assigned as the coordinate entry $P_{5,0,1}$ indicated by hatching) into each of the lower hierarchies than the hierarchy 0 (highest hierarchy) of the reference scalability R and the lower hierarchy than the hierarchy 1 of the reference scalability C, and the hash operation from the lowest hierarchy to the highest hierarchy of the scalability L (hash operation on the split key $e^{RL}_{R0}$ using the one-way hash function H).

Figure 24A:
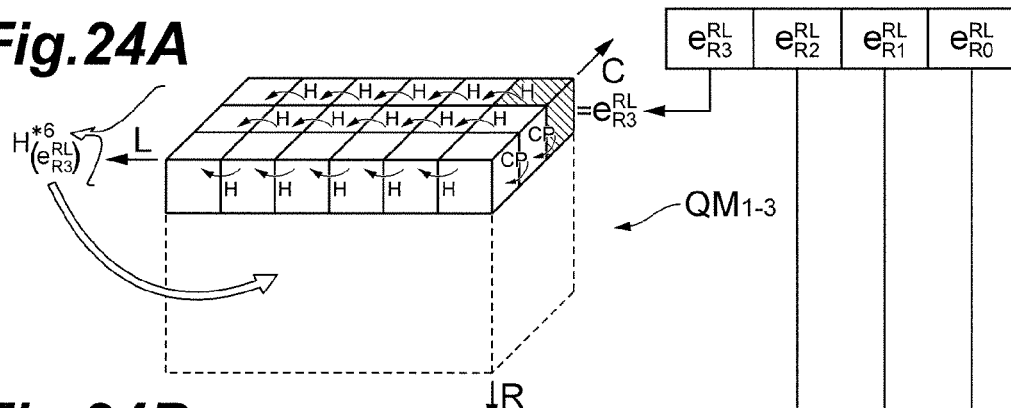
FIGS. 24A to 24D show drawings for explaining generation steps of multidimensional key element matrices by the matrix generating means in the encryption key generating apparatus according to the fifth embodiment (generation of a multidimensional key element matrix group corresponding to the highest hierarchy of scalability C other than reference scalabilities L and R).

Furthermore, FIG. 24A shows the three-dimensional key element matrix $QM_{1-3}$ generated using the split key $e^{RL}_{R3}$ corresponding to hierarchy 3 (lowest hierarchy) of the reference scalability R, for hierarchy 0 (highest hierarchy) of the scalability C other than the reference scalabilities L and R.

The split key $e^{RL}_{R3}$ is assigned to the coordinate entry $P_{5,3,0}$ (the hatched portion in FIG. 24A) in the three-dimensional matrix, and then this split key $e^{RL}_{R3}$ is copied (CP) once into each of the coordinate entries $P_{5,3,C=1,2}$. Then, for each of hierarchy 2 (lowest hierarchy) to hierarchy 0 (highest hierarchy) of the scalability C in hierarchy 3 (highest hierarchy) of the reference scalability R, the hash operation on the split key $e^{RL}_{R3}$ using the one-way hash function H is carried out in order from the lowest hierarchy to the highest hierarchy of the scalability L. Namely, every time the hash operation is carried out, resultant operation data is assigned to a corresponding coordinate entry (all entries located in a region surrounded by solid lines in FIG. 24A). At this time, operation data $H^{*5}(e^{RL}_{R3})$ is assigned to each coordinate entry corresponding to the highest hierarchy of the scalability L. On the other hand, each of the coordinate entries (all entries located in a region surrounded by dashed lines in FIG. 24A) except for the coordinate entries $P_{L=0-5,R=3,C=0-2}$ assigned the operation data is assigned operation data $H^{*6}(e^{RL}_{R3})$ obtained by further carrying out the hash operation with the one-way hash function H on the operation data $H^{*5}(e^{RL}_{R3})$ assigned to the coordinate entries corresponding to the highest hierarchy of the scalability L. The above operations generate the three-dimensional key element matrix $QM_{1-3}$.

Figure 24B:
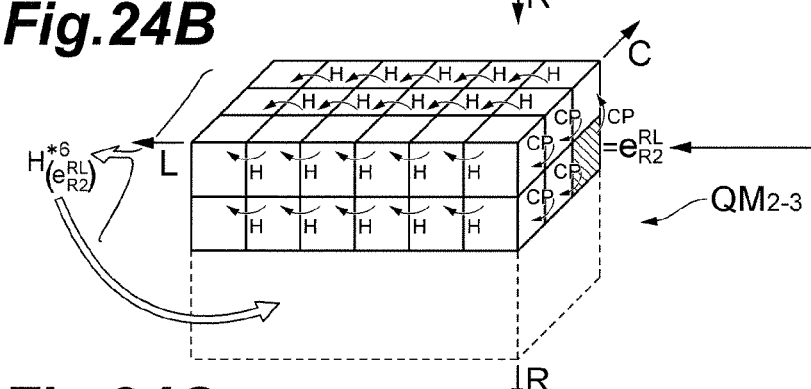

FIG. 24B shows the three-dimensional key element matrix $QM_{2-3}$ generated using the split key $e^{RL}_{R2}$ corresponding to hierarchy 2 (hierarchy higher by one hierarchy than the lowest hierarchy) of the reference scalability R, for hierarchy 0 (highest hierarchy) of the scalability C other than the reference scalabilities L and R.

In generation of this three-dimensional key element matrix $QM_{2-3}$, the split key $e^{RL}_{R2}$ is assigned to the coordinate entry $P_{5,2,0}$ (the hatched portion in FIG. 24B) in the three-dimensional matrix. At this time, the split key $e^{RL}_{R2}$ is copied (CP) once into each of the coordinate entries $P_{5,2-3,0-2}$. Then, for each of hierarchy 2 (highest hierarchy) to hierarchy 0 (lowest hierarchy) of the scalability C in hierarchy 3 and hierarchy 2 of the scalability R, the hash operation on the split key $e^{RL}_{R2}$ using the one-way hash function H is carried out in order from the lowest hierarchy to the highest hierarchy of the scalability L. Namely, every time the hash operation is carried out, resultant operation data is assigned to a corresponding coordinate entry (all entries located in a region surrounded by solid lines in FIG. 24B). At this time, operation data $H^{*5}(e^{RL}_{R2})$ is assigned to each of the coordinate entries corresponding to the highest hierarchy of the scalability L. On the other hand, each of the coordinate entries (all entries located in a region surrounded by dashed lines in FIG. 24B) except for the coordinate entries $P_{L=0-5,R=2-3,C=0-2}$ assigned the operation data, is assigned operation data $H^{*6}(e^{RL}_{R2})$ obtained by further carrying out the hash operation with the one-way hash function H on the operation data $H^{*5}(e^{RL}_{R2})$ assigned to the coordinate entries corresponding to the highest hierarchy of the scalability L. The above operations generate the three-dimensional key element matrix $QM_{2-3}$.

Figure 24C:
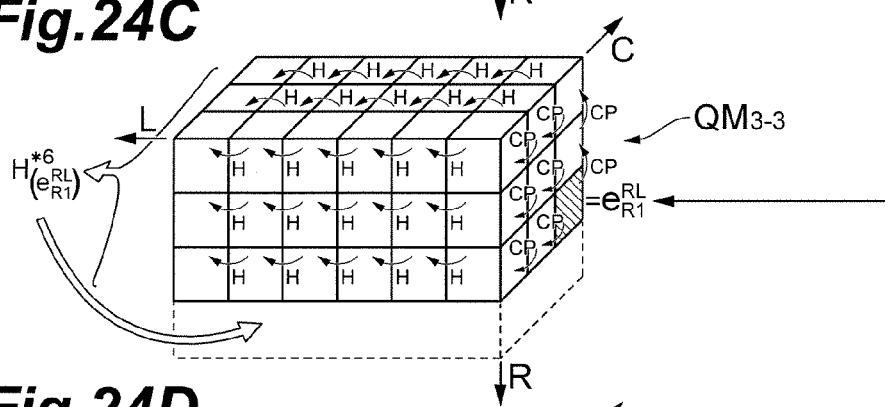
Figure 24D:
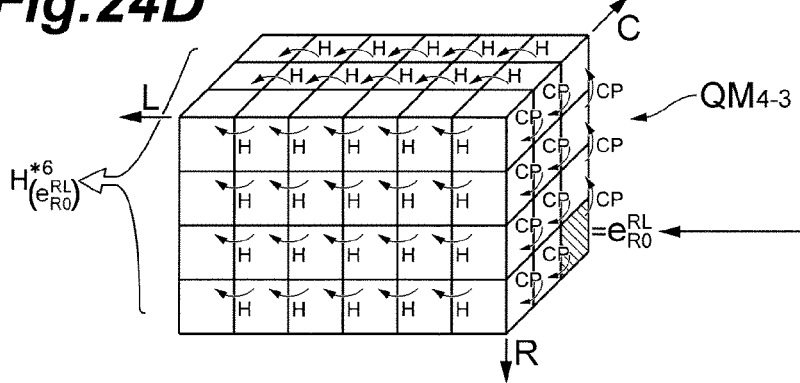

The three-dimensional key element matrix $QM_{3-3}$ shown in FIG. 24C is also generated in the same manner as in the generation of the three-dimensional key element matrices $QM_{1-3}$ and $QM_{2-3}$ described above, by repeating the copy operation of the split key $e^{RL}_{R1}$ (assigned as the coordinate entry $P_{5,1,0}$ indicated by hatching) into each of the lower hierarchies than hierarchy 1 of the reference scalability R and the lower hierarchies than the hierarchy 0 (highest hierarchy) of the scalability C, and the hash operation from the lowest hierarchy to the highest hierarchy of the scalability L (hash operation on the split key $e^{RL}_{R1}$ using the one-way hash function H). Similarly, the three-dimensional key element matrix $QM_{4-3}$ shown in FIG. 24D is also generated by repeating the copy operation of the split key $e^{RL}_{R0}$ (assigned as the coordinate entry $P_{5,0,0}$ indicated by hatching) into each of the lower hierarchies than the hierarchy 0 (highest hierarchy) of the reference scalability R and the lower hierarchies than the hierarchy 0 (highest hierarchy) of the reference scalability C, and the hash operation from the lowest hierarchy to the highest hierarchy of the scalability L (hash operation on the split key $e^{RL}_{R0}$ using the one-way hash function H).

The three-dimensional partial key matrix QM by the encryption key generating method of the fifth embodiment is obtained by the key dividing means 461 combining the coordinate entries at the same coordinate positions in the three-dimensional key element matrices $QM_{1-1}$-$QM_{4-1}$, $QM_{1-2}$-$QM_{4-2}$, and $QM_{1-3}$-$QM_{4-3}$ shown in FIGS. 22A to 24D, which were generated by the matrix generating means 462 repeating the hash operation described above. The output means 480 outputs such a three-dimensional partial keys generated by the key generating means 463 to the coding means 410.

According to the apparatus and method of present invention, as described above, the partial keys for the hierarchies at subordinately higher positions are generated by making use of the one-way hash function from the master key, and, therefore, a partial key corresponding to one data unit specified by hierarchical levels in respective scalabilities cannot be generated from any partial key corresponding to a data unit at a higher hierarchical position in one of the scalabilities. Therefore, it becomes feasible to prevent collusion attacks. Since the partial keys are generated for each of combinations of two types of scalabilities as scalabilities of access control targets, it is feasible to reduce the key length of the generated partial keys.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An encryption key generating apparatus, applied to a communication system offering a delivery service of digital data with two or more types of hierarchical scalabilities, for generating an encryption key used in coding and decoding of the digital data, the encryption key generating apparatus comprising:

input means for inputting an encryption key used in coding and decoding of a data unit in hierarchies at a lowest position out of hierarchies satisfying a service level allowed by the communication system, in each of first and second scalabilities selected from the two or more types of scalabilities;

non-transitory storage means for storing, as a master key, the encryption key inputted by the input means;

key dividing means for dividing the master key read out from the storage means, by a number of hierarchies in the first scalability set as a reference scalability out of the first and second scalabilities, to generate split keys corresponding to the respective hierarchies in the first scalability;

matrix generating means, concerning a key element matrix generated based on one split key out of the split keys generated by the key dividing means, for assigning operation data successively obtained by repeating a hash operation on the one split key using a one-way hash function, at least to coordinate entries corresponding to respective hierarchies from the lowest hierarchy to the highest hierarchy in the second scalability in a hierarchy in the first scalability corresponding to the one split key, so as to generate key element matrices as coordinate representations of hierarchical values in the first and second scalabilities, for the respective hierarchies in the first scalability;

key generating means for combining key elements coordinately consistent among the key element matrices generated by the matrix generating means, to generate partial keys corresponding to data units in the respective hierarchies in the first and second scalabilities; and output means for outputting the partial keys generated by the key generating means to a device for executing at least one of coding and decoding of the digital data.

2. The encryption key generating apparatus according to claim 1, wherein the key dividing means selects, as the reference scalability, a scalability with the smaller number of hierarchies out of the first and second scalabilities.

3. The encryption key generating apparatus according to claim 1, wherein, as entry information of a key element matrix generated based on one split key out of the split keys, the matrix generating means assigns the same operation data as operation data successively obtained for a hierarchy of the one split key, to coordinate entries corresponding to respective hierarchies from the lowest hierarchy to the highest hierarchy of the second scalability in a hierarchy at a lower position than the hierarchy in the first scalability corresponding to the one split key, and further assigns operation data obtained by a hash operation with a one-way hash function on a key element in the highest hierarchy of the second scalability out of key elements in the hierarchy corresponding to the one split key, to all coordinate entries corresponding to respective hierarchies from the lowest hierarchy to the highest hierarchy of the second scalability in a hierarchy at a higher position than the hierarchy in the first scalability corresponding to the one split key.

4. The encryption key generating apparatus according to claim 1, wherein, for each of all combinations of two types of scalabilities selectable from the two or more types of scalabilities, the matrix generating means generates a partial key element matrix as a coordinate representation of hierarchical values in the two types of scalabilities, and further generates a hierarchy table showing all combinations of hierarchical values in the two or more types of scalabilities, the hierarchy table showing a coordinate representation of a partial key matrix whose entries are partial keys corresponding to data units in respective hierarchies in the two or more types of scalabilities, by combined hierarchical values, and wherein, for all the combinations of hierarchical values in the hierarchy table, the key generating means successively generates the partial keys being the entries in the partial key element matrix, by combining entries in the respective partial key element matrices generated for all the combinations of two types of scalabilities, each of which is specified by two hierarchical values out of hierarchical values constituting one combination and types of the scalabilities, to successively generate the partial keys being the entries in the partial key element matrix.

5. An encryption key generating apparatus, applied to a communication system offering a delivery service of digital data with three or more types of hierarchical scalabilities, for generating an encryption key used in coding and decoding of the digital data, the encryption key generating apparatus comprising:

input means for inputting an encryption key used in coding and decoding of a data unit in hierarchies at a lowest position out of hierarchies satisfying a service level allowed by the communication system, in each of the three or more types of scalabilities;

non-transitory storage means for storing, as a master key, the encryption key inputted by the input means;

key dividing means for dividing the master key read out from the storage means, by a number of hierarchies in a first reference scalability out of first and second reference scalabilities selected from the three or more types of scalabilities, to generate split keys corresponding to respective hierarchies in the first reference scalability;

matrix generating means for generating a multidimensional key element matrix as a coordinate representation of hierarchical values in the three or more types of scalabilities, by a series of operations corresponding to the respective hierarchies in the first reference scalability, for each hierarchy in each of scalabilities other than the first and second reference scalabilities out of the three or more types of scalabilities, the matrix generating means, in each of multidimensional key element matrices obtained, assigning at least coordinate entries corresponding to respective hierarchies from the lowest hierarchy to the highest hierarchy in the second reference scalability in a hierarchy in the first reference scalability corresponding to one split key out of the split keys generated by the key dividing means, operation data successively obtained by repeating a hash operation on the one split key using a one-way hash function; and key generating means for combining coordinately consistent entries among the multidimensional key element matrices, generated by the matrix generating means, by the series of operations corresponding to the respective hierarchies in the first reference scalability, for the respective hierarchies in the other scalability, to generate partial keys corresponding to data units in respective hierarchies in the three or more types of scalabilities; and output means for outputting the partial keys generated by the key generating means to a device for executing at least one of coding and decoding of the digital data.

6. The encryption key generating apparatus according to claim 5, wherein, as entry information in each of the multidimensional key element matrices generated by the series of operations corresponding to the respective hierarchies in the first reference scalability, for the respective hierarchies in the other scalability, the matrix generating means assigns coordinate entries corresponding to respective hierarchies from the lowest hierarchy to the highest hierarchy of the second reference scalability in a hierarchy at a lower position than respective corresponding hierarchies of the other scalability and the first reference scalability, the same operation data as operation data successively obtained using one split key assigned to the corresponding hierarchy of the first reference scalability, and further assigns all coordinate entries corresponding to respective hierarchies from the lowest hierarchy to the highest hierarchy of the second reference scalability in a scalability at a higher position than the respective corresponding hierarchies of the other scalability and the first reference scalability, operation data obtained by a hash operation with a one-way hash function on a key element in the highest hierarchy of the second reference scalability out of key elements in the hierarchy corresponding to the one split key.

7. An encryption key generating method for generating an encryption key used in coding and decoding of digital data with two or more types of hierarchical scalabilities, the encryption key generating method comprising the steps of:

preparing as a master key, an encryption key used in coding and decoding of a data unit in hierarchies at a lowest position out of hierarchies satisfying a service level allowed by the communication system, in each of first and second scalabilities selected from the two or more types of scalabilities;

dividing, by using a controller in a computer, the master key prepared, by a number of hierarchies in the first scalability set as a reference scalability out of the first and second scalabilities, to generate split keys corresponding to the respective hierarchies in the first scalability;

concerning a key element matrix generated based on one split key out of the split keys, assigning operation data successively obtained by repeating a hash operation on the one split key using a one-way hash function, at least to coordinate entries corresponding to respective hierarchies from the lowest hierarchy to the highest hierarchy in the second scalability in a hierarchy in the first scalability corresponding to the one split key, so as to generate key element matrices as coordinate representations of hierarchical values in the first and second scalabilities, for the respective hierarchies in the first scalability; and combining key elements coordinately consistent among the key element matrices generated, to generate partial keys corresponding to data units in the respective hierarchies in the first and second scalabilities.

8. The encryption key generating method according to claim 7, wherein a scalability with the smaller number of hierarchies out of the first and second scalabilities is selected as the reference scalability.

9. The encryption key generating method according to claim 7, wherein a key element matrix generated based on one split key out of the split keys is generated by assigning the same operation data as operation data successively obtained for a hierarchy of the one split key, to coordinate entries corresponding to respective hierarchies from the lowest hierarchy to the highest hierarchy of the second scalability in a hierarchy at a lower position than the hierarchy in the first scalability corresponding to the one split key, and by assigning operation data obtained by a hash operation with a one-way hash function on a key element in the highest hierarchy of the second scalability out of key elements in the hierarchy corresponding to the one split key, to all coordinate entries corresponding to respective hierarchies from the lowest hierarchy to the highest hierarchy of the second scalability in a hierarchy at a higher position than the hierarchy in the first scalability corresponding to the one split key.

10. The encryption key generating method according to claim 7, comprising the steps of:
for each of all combinations of two types of scalabilities selectable from the two or more types of scalabilities, generating a partial key element matrix as a coordinate representation of hierarchical values in the two types of scalabilities;
generating a hierarchy table showing all combinations of hierarchical values in the two or more types of scalabilities, the hierarchy table showing a coordinate representation of a partial key matrix whose entries are partial keys corresponding to data units in respective hierarchies in the two or more types of scalabilities, by combined hierarchical values; and
for all the combinations of hierarchical values in the hierarchy table, combining entries in the respective partial key element matrices generated for all the combinations of two types of scalabilities, each of which is specified by two hierarchical values out of hierarchical values constituting one combination and types of the scalabilities, to successively generate the partial keys being the entries in the partial key element matrix.

11. An encryption key generating method for generating an encryption key used in coding and decoding of digital data with three or more types of hierarchical scalabilities, the encryption key generating method comprising the steps of:
preparing as a master key, an encryption key used in coding and decoding of a data unit in hierarchies at a lowest position in each of the three or more types of scalabilities;
dividing, by using a controller in a computer, the master key prepared, by a number of hierarchies in a first reference scalability out of first and second reference scalabilities selected from the three or more types of scalabilities, to generate split keys corresponding to respective hierarchies in the first reference scalability;
generating a multidimensional key element matrix as a coordinate representation of hierarchical values in the three or more types of scalabilities, by a series of operations corresponding to the respective hierarchies in the first reference scalability, for each hierarchy in each of scalabilities other than the first and second reference scalabilities out of the three or more types of scalabilities, and, in each of multidimensional key element matrices obtained, assigning at least coordinate entries corresponding to respective hierarchies from the lowest hierarchy to the highest hierarchy in the second reference scalability in a hierarchy in the first reference scalability corresponding to one split key out of the split keys, operation data successively obtained by repeating a hash operation on the one split key using a one-way hash function; and
combining coordinately consistent entries among the multidimensional key element matrices generated by the series of operations corresponding to the respective hierarchies in the first reference scalability, for the respective hierarchies in the other scalability, to generate partial keys corresponding to data units in respective hierarchies in the three or more types of scalabilities.

12. The encryption key generating method according to claim 11, wherein each of the multidimensional key element matrices generated by the series of operations corresponding to the respective hierarchies in the first reference scalability, for the respective hierarchies in the other scalability, is generated by assigning coordinate entries corresponding to respective hierarchies from the lowest hierarchy to the highest hierarchy of the second reference scalability in a hierarchy at a lower position than respective corresponding hierarchies of the other scalability and the first reference scalability, the same operation data as operation data successively obtained using one split key assigned to the corresponding hierarchy of the first reference scalability, and by assigning all coordinate entries corresponding to respective hierarchies from the lowest hierarchy to the highest hierarchy of the second reference scalability in a scalability at a higher position than the respective corresponding hierarchies of the other scalability and the first reference scalability, operation data obtained by a hash operation with a one-way hash function on a key element in the highest hierarchy of the second reference scalability out of key elements in the hierarchy corresponding to the one split key.

* * * * *